United States Patent
Cui et al.

(10) Patent No.: US 11,546,778 B2
(45) Date of Patent: Jan. 3, 2023

(54) ELECTRONIC DEVICE AND METHOD FOR WIRELESS COMMUNICATION AND COMPUTER-READABLE STORAGE MEDIUM

(71) Applicant: Sony Corporation, Tokyo (JP)

(72) Inventors: Qimei Cui, Beijing (CN); Bowen Cai, Beijing (CN); Tao Cui, Beijing (CN); Xiaofeng Tao, Beijing (CN)

(73) Assignee: SONY CORPORATION, Tokyo (JP)

( * ) Notice: Subject to any disclaimer, the term of this patent is extended or adjusted under 35 U.S.C. 154(b) by 72 days.

(21) Appl. No.: 17/257,016

(22) PCT Filed: Jul. 24, 2019

(86) PCT No.: PCT/CN2019/097451
§ 371 (c)(1),
(2) Date: Dec. 30, 2020

(87) PCT Pub. No.: WO2020/024854
PCT Pub. Date: Feb. 6, 2020

(65) Prior Publication Data
US 2021/0368351 A1 Nov. 25, 2021

(30) Foreign Application Priority Data
Jul. 31, 2018 (CN) .......................... 201810867254.1

(51) Int. Cl.
*H04W 16/14* (2009.01)
*H04W 74/00* (2009.01)

(52) U.S. Cl.
CPC ......... *H04W 16/14* (2013.01); *H04W 74/002* (2013.01)

(58) Field of Classification Search
CPC .......................... H04W 16/14; H04W 74/002
(Continued)

(56) References Cited

U.S. PATENT DOCUMENTS

| 2016/0212625 | A1 | 7/2016 | Damnjanovic et al. |
| 2017/0150382 | A1* | 5/2017 | Martin .............. H04W 72/0446 |

(Continued)

FOREIGN PATENT DOCUMENTS

| CN | 105611637 A | 5/2016 |
| CN | 105933982 A | 9/2016 |

(Continued)

OTHER PUBLICATIONS

International Search Report and Written Opinion dated Sep. 2, 2019, received for PCT Application No. PCT/CN2019/097451, Filed on Jul. 24, 2019, 8 pages including English Translation.

(Continued)

*Primary Examiner* — Gbemileke J Onamuti
(74) *Attorney, Agent, or Firm* — Xsensus LLP

(57) ABSTRACT

The present disclosure provides an electronic device and a method for wireless communication and a computer-readable storage medium. An electronic device comprising: a processing circuit configured to: generate, where a user equipment accesses an unauthorized frequency band successfully, an indication representing whether sharing a channel occupancy time of the user equipment with other user equipment is permitted; and send the indication to a base station or the other user equipment.

8 Claims, 14 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2018/0279355 A1 | 9/2018 | Soldati et al. | |
| 2018/0368090 A1* | 12/2018 | Kadambar | H04W 72/1278 |
| 2020/0374933 A1* | 11/2020 | Lou | H04W 74/0833 |
| 2021/0092768 A1 | 3/2021 | Kim et al. | |
| 2021/0167900 A1* | 6/2021 | Karaki | H04L 1/1819 |
| 2021/0274555 A1* | 9/2021 | Alfarhan | H04W 74/0808 |

FOREIGN PATENT DOCUMENTS

| | | |
|---|---|---|
| CN | 108293266 A | 7/2018 |
| WO | WO-2017126935 A1 | 7/2017 |

OTHER PUBLICATIONS

Broadcom Limited, "Discussion on LAA Paused COT and UL Traffic Multiplexing", 3GPP TSG-RAN WG1 Meeting #85, R1-165318, May 23-27, 2016, Nanjing, total 7 pages.

ZTE, "Discussion on configured grant for NR-U", 3GPP TSG RAN WG1 Meeting #93, R1-1806465, May 21-25th, 2018, Busan, Korea, total 3 pages.

\* cited by examiner

ELECTRONIC DEVICE AND METHOD FOR WIRELESS COMMUNICATION AND COMPUTER-READABLE STORAGE MEDIUM

CROSS-REFERENCE TO RELATED APPLICATIONS

The present application is based on PCT filing PCT/CN2019/097451, filed Jul. 24, 2019, which claims priority to Chinese Patent Application No. 201810867254.1, titled "ELECTRONIC DEVICE AND METHOD FOR WIRELESS COMMUNICATION AND COMPUTER-READABLE STORAGE MEDIUM", filed on Jul. 31, 2018 with the China National Intellectual Property Administration, each of which is incorporated herein by reference in its entirety.

FIELD

The present disclosure relates to the technical field of wireless communications, in particular to transmission technology on an unlicensed frequency band, and more particular to an electronic apparatus and a method for wireless communications and a computer readable storage medium.

BACKGROUND

Before accessing into an unlicensed frequency band, user equipment (UE) needs to perform channel detection such as listen before talk (LBT), to determine whether an unlicensed channel is idle. Only in a case that the channel detection indicates that the unlicensed channel is idle, the UE can successfully access into the unlicensed frequency band for transmission. If the channel detection indicates that the unlicensed channel is occupied, the UE needs to perform random backoff and perform channel detection again, until the channel detection indicates that the unlicensed channel is idle. However, it is inappropriate for some scenarios sensitive to latency, such as Ultra Reliable and Low Latency Communication (URLLC).

After accessing into the unlicensed frequency band, the UE may continuously occupy the channel for a length of maximum channel occupancy time (MCOT).

In addition, in the non-orthogonal multiple access (NOMA) architecture, multiple UE may access into the same time and frequency resources.

SUMMARY

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

According to an aspect of the present disclosure, an electronic apparatus for wireless communications is provided. The electronic apparatus includes processing circuitry, configured to: generate, in a case that UE has accessed into an unlicensed frequency band successfully, indication denoting whether to allow sharing of channel occupancy time (COT) of the UE with other UE; and transmit the indication to a base station or the other UE.

According to an aspect of the present disclosure, a method for wireless communications is provided. The method includes: generating, in a case that UE has accessed into an unlicensed frequency band successfully, indication denoting whether to allow sharing of channel occupancy time of the UE with other UE; and transmitting the indication to a base station or the other UE.

According to the electronic apparatus and the method described in the above aspects of the present disclosure, the indication denoting whether to allow sharing the COT with other UE is transmitted, so that the other UE can share the COT of the present UE, thereby improving utilization efficiency of spectrum resources of the unlicensed frequency band and reducing a delay for accessing into the unlicensed frequency band.

According to an aspect of the present disclosure, an electronic apparatus for wireless communications is provided. The electronic apparatus includes processing circuitry, configured to: acquire, from UE having accessed into an unlicensed frequency band successfully, indication denoting whether to allow other UE to share channel occupancy time of the UE; and in a case that the indication denotes that the other UE is allowed to share the channel occupancy time of the UE, schedule, for the other UE, spectrum resources accessed by the UE within the channel occupancy time.

According to an aspect of the present disclosure, a method for wireless communications is provided. The method includes: acquiring, from UE having accessed into an unlicensed frequency band successfully, indication denoting whether to allow other UE to share channel occupancy time of the UE; and in a case that the indication denotes that the other UE is allowed to share the channel occupancy time of the UE, scheduling, for the other UE, spectrum resources accessed by the UE within the channel occupancy time.

According to the electronic apparatus and the method in the above aspects of the present disclosure, based on the indication from the UE denoting whether to allow sharing the COT of the UE with other UE, multiple UE can share the COT of a single UE.

According to an aspect of the present disclosure, an electronic apparatus for wireless communications is provided. The electronic apparatus includes processing circuitry, configured to: generate, in a case that UE having accessed into an unlicensed frequency band successfully, an indication denoting whether to support multiple switching points within a maximum channel occupancy time, wherein the switching point indicates switching between uplink transmission and downlink transmission; and comprise the indication in uplink control information, to be transmitted to a base station.

According to an aspect of the present disclosure, a method for wireless communications is provided. The method includes: generating, in a case that UE having accessed into an unlicensed frequency band successfully, an indication denoting whether to support multiple switching points within a maximum channel occupancy time, wherein the switching point indicates switching between uplink transmission and downlink transmission; and comprising the indication in uplink control information, to be transmitted to a base station.

According to the electronic apparatus and the method in the above aspects of the present disclosure, multiple switching points within one MCOT can be supported on the unlicensed frequency band.

According to an aspect of the present application, an electronic apparatus for wireless communications is provided. The electronic apparatus includes processing circuitry, configured to: acquire, from UE having accessed into an unlicensed frequency band successfully, an indication denoting whether to support multiple switching points within maximum channel occupancy time, wherein the switching point indicates switching between uplink transmission and downlink transmission; and schedule, based on the indication, spectrum resources accessed by the UE within the maximum channel occupancy time.

According to an aspect of the present disclosure, a method for wireless communications is provided. The method includes: acquiring, from UE having accessed into an unlicensed frequency band successfully, an indication denoting whether to support multiple switching points within maximum channel occupancy time, wherein the switching point indicates switching between uplink transmission and downlink transmission; and scheduling, based on the indication, spectrum resources accessed by the UE within the maximum channel occupancy time.

According to the electronic apparatus and the method in the above aspects of the present disclosure, multiple switching points within one MCOT can be supported on the unlicensed frequency band.

According to an aspect of the present disclosure, an electronic apparatus for wireless communications is provided. The electronic apparatus includes processing circuitry configured to: acquire, in a case that a first Non-Orthogonal Multiple Access UE having accessed into an unlicensed frequency band successfully, channel occupancy time sharing information of the first Non-Orthogonal Multiple Access UE; and provide the channel occupancy time sharing information to at least one second Non-Orthogonal Multiple Access UE which are to access into the same spectrum resources, so that the at least one second Non-Orthogonal Multiple Access UE accesses into the spectrum resources within the channel occupancy time of the first Non-Orthogonal Multiple Access UE without performing channel detection or by just performing a simplified version of channel detection.

According to an aspect of the present disclosure, a method for wireless communications is provided. The method includes: acquiring, in a case that a first Non-Orthogonal Multiple Access UE having accessed into an unlicensed frequency band successfully, channel occupancy time sharing information of the first Non-Orthogonal Multiple Access UE; and providing the channel occupancy time sharing information to at least one second Non-Orthogonal Multiple Access UE which are to access into the same spectrum resources, so that the at least one second Non-Orthogonal Multiple Access UE accesses into the spectrum resources within the channel occupancy time of the first Non-Orthogonal Multiple Access UE without performing channel detection or by just performing a simplified version of channel detection.

According to the electronic apparatus and the method in the above aspects of the present disclosure, the COT can be shared among the Non-Orthogonal Multiple Access UE on the unlicensed frequency band, thereby reducing a load caused by channel detection and improving efficiency.

According to an aspect of the present disclosure, an electronic apparatus for wireless communications is provided. The electronic apparatus includes processing circuitry configured to: cause a first Non-Orthogonal Multiple Access UE where the electronic apparatus is located to try to access into an unlicensed frequency band via channel detection; and in a case that the first Non-Orthogonal Multiple Access UE successfully accesses into the unlicensed frequency band, transmit channel occupancy time sharing information of the first Non-Orthogonal Multiple Access UE to at least one second Non-Orthogonal Multiple Access UE through physical sidelink control channel (PSCCH), wherein the at least one second Non-Orthogonal Multiple Access UE accesses into spectrum resources the same as those of the first Non-Orthogonal Multiple Access UE within the channel occupancy time of the first Non-Orthogonal Multiple Access UE based on the channel occupancy time sharing information, without performing channel detection or by just performing a simplified version of channel detection.

According to an aspect of the present disclosure, a method for wireless communications is provided. The method includes: causing a first Non-Orthogonal Multiple Access UE to try to access into an unlicensed frequency band via channel detection; and in a case that the first Non-Orthogonal Multiple Access UE successfully accesses into the unlicensed frequency band, transmitting channel occupancy time sharing information of the first Non-Orthogonal Multiple Access UE to at least one second Non-Orthogonal Multiple Access UE through physical sidelink control channel, wherein the at least one second Non-Orthogonal Multiple Access UE accesses into spectrum resources the same as those of the first Non-Orthogonal Multiple Access UE within the channel occupancy time of the first Non-Orthogonal Multiple Access UE based on the channel occupancy time sharing information, without performing channel detection or by just performing a simplified version of channel detection.

According to the electronic apparatus and the method in the above aspects of the present disclosure, the COT can be shared among the Non-Orthogonal Multiple Access UE through PSCCH, thereby reducing a load caused by channel detection and improving efficiency.

According to other aspects of the present disclosure, there are further provided computer program codes and computer program products for implementing the methods for wireless communications above, and a computer readable storage medium having recorded thereon the computer program codes for implementing the methods for wireless communications described above.

These and other advantages of the present disclosure will be more apparent by illustrating in detail a preferred embodiment of the present disclosure in conjunction with accompanying drawings below.

BRIEF DESCRIPTION OF THE DRAWINGS

To further set forth the above and other advantages and features of the present disclosure, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present disclosure and should not be construed as a limitation to the scope of the disclosure.

In the accompanying drawings.

DETAILED DESCRIPTION OF EMBODIMENTS

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the accompanying drawing, and other details having little relationship to the present disclosure are omitted.

First Embodiment

Figure 1:
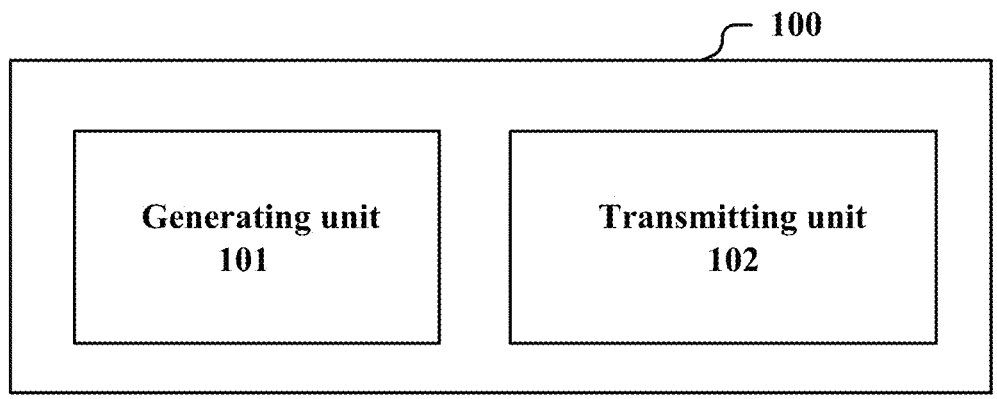
FIG. 1 shows a block diagram of functional modules of an electronic apparatus for wireless communications according to an embodiment of the present disclosure.

FIG. 1 shows a block diagram of functional modules of an electronic apparatus 100 for wireless communications according to an embodiment of the present disclosure. The electronic apparatus 100 includes a generating unit 101 and a transmitting unit 102. The generating unit 101 is configured to generate, in a case that UE has accessed into an unlicensed frequency band successfully, indication denoting whether to allow sharing of channel occupancy time of the UE with other UE. The transmitting unit 102 is configured to transmit the indication to a base station or the other UE.

The generating unit 101 and the transmitting unit 102 may be implemented by one or more processing circuitries. The processing circuitry may be implemented as a chip, for example. It should be understood that, the functional units in the apparatus shown in FIG. 1 are only logical modules divided according to the functions realized, rather than limiting the implementations. This also applies to examples of other electronic apparatus described later.

The electronic apparatus 100 may be, for example, arranged at UE side or communicatively connected to the UE. It should be noted here that, the electronic apparatus 100 may be implemented as a chip or a device. For example, the electronic apparatus 100 may function as the UE itself, and may further include external apparatus such as a memory and a transceiver (not shown). The memory may be configured to store programs executed by the UE for achieving various functions, and related data information. The transceiver may include one or more communication interfaces to support communication with different devices (for example, a base station, other user equipment and the like). Implementations of the transceiver are not limited here. This also applies to examples of other electronic apparatus described later.

On an unlicensed frequency band, the UE performs channel detection such as LBT when the UE is to transmit data. In a case that the LBT indicates that a channel is idle, the UE accesses into the unlicensed frequency band. In this case, the UE may perform data transmission for maximum time of MCOT using the unlicensed channel. However, in some cases, the UE may only have quite short an uplink transmission burst, and thus needs to occupy the channel for time less than MCOT. The electronic apparatus 100 according to the present disclosure may share the remaining time in the MCOT with other UE, thereby improving resource utilization efficiency of the unlicensed frequency band.

For example, the sharing includes that other UE accesses into spectrum resources which are accessed by the present UE within the COT of the present UE, without performing channel detection or by just performing a simplified version of channel detection. In the present disclosure, for easier distinguishing, the UE indicates UE providing sharing COT, and other UE indicates UE sharing the COT. For example, the present UE may need to perform Cat 4 LBT when accessing into the unlicensed frequency band. Other UE may perform only 25 µs LBT or not perform LBT when sharing the COT of the present UE, depending on a transmission interval between the present UE and the other UE. The sharing may be implemented via scheduling by a base station, or may be implemented via instructing the other UE by the present UE through a sidelink.

In an example, the transmitting unit 102 may include the indication in uplink control information (UCI), to be transmitted to the base station. For example, an information bit of one bit may be added in the UCI for the indication. In a case that the information bit is 1, it is indicated that other UE is allowed to share the COT of the present UE; and in a case that the information bit is 0, it is indicated that other UE is not allowed to share the COT of the present UE. Alternatively, indications of 0 and 1 can be defined in an opposite manner. Alternatively, the indication can be transmitted by multiplexing a COT sharing indicator in the UCI. The COT sharing indicator denotes whether to allow the base station to transmit a control instruction by sharing the COT of the UE. That is, the COT sharing indicator in the UCI is originally used for indicating whether the base station can transmit downlink control information such as ACK/NACK for the present UE by sharing the COT of the present UE. In the embodiment, the COT sharing indicator is further used for indicating whether to allow other UE to share the COT of the present UE. For example, in a case that the COT sharing indicator is set as 1, it is indicated that the base station and other UE are allowed to share the COT of the present UE; and in a case that the COT sharing indicator is set as 0, it is indicated that the base station and other UE are not allowed to share the COT of the present UE. Alternatively, indications of 0 and 1 are defined in an opposite manner.

In addition, in a case that other UE is allowed to share the COT of the present UE, the transmitting unit 102 is further configured to transmit information of at least one of duration of the MCOT, maximum channel occupancy expiration time, a priority level and a time slot available for sharing of the UE, to the base station. For example, the above information may be included in the UCI to be transmitted to the base station. The base station schedules remaining time of the COT of the present UE for other UE and/or the base station itself. The base station and/or other UE can access into the spectrum resources of the present UE within the COT of the present UE, without performing channel detection or by just performing a simplified version of channel detection, thereby reducing latency, meeting requirements of services sensitive to the latency, and improving resource utilization efficiency of the unlicensed frequency band.

In another example, the transmitting unit 102 may also directly transmit an indication of whether to allow other UE to share the COT to other UE. For example, this can be achieved by a D2D link between two UEs. The transmitting unit 102 may include the above mentioned indication in sidelink control information (SCI) to be transmitted to other UE. In addition, information of at least one of the duration of the MCOT, the maximum channel occupancy expiration time, the priority level and the time slot available for sharing of the present UE may be included in the SCI to be transmitted to other UE. After receiving the indication in the SCI from the present UE, other UE may determine whether the COT of the present UE can be shared. In a case that the COT of the present UE can be shared, other UE accesses into the spectrum resources of the present UE for data transmission within the COT of the present UE, without performing channel detection or by just performing a simplified version of channel detection.

In summary, with the electronic apparatus 100 according to the embodiment, the COT of the present UE can be shared with other UE by the indication denoting whether to allow sharing the COT of the present UE with other UE, thereby improving spectrum efficiency of the unlicensed frequency band on one hand, and realizing transmission with low latency on the other hand.

Second Embodiment

Figure 2:
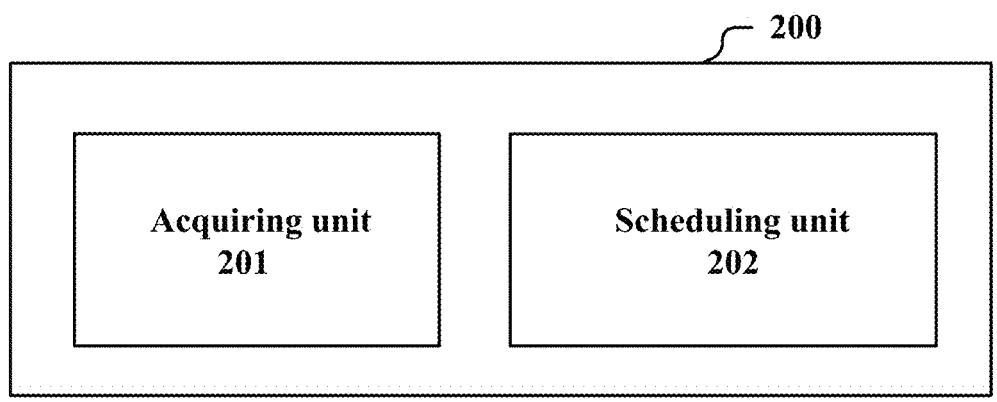
FIG. 2 shows a block diagram of functional modules of an electronic apparatus for wireless communications according to another embodiment of the present disclosure.

FIG. 2 shows a block diagram of functional modules of an electronic apparatus 200 for wireless communications according to another embodiment of the present disclosure. As shown in FIG. 2, the electronic apparatus 200 includes an acquiring unit 201 and a scheduling unit 202. The acquiring unit 201 is configured to acquire, from UE having accessed into an unlicensed frequency band successfully, an indication denoting whether to allow other UE to share COT of the present UE. The scheduling unit 202 is configured to schedule spectrum resources accessed by the present UE for other UE within the COT, in a case that the indication denotes that other UE is allowed to share the COT of the present UE.

Similarly, the acquiring unit 201 and the scheduling unit 202 may be implemented by one or more processing circuitries. The processing circuitry may be implemented as a chip. It should be understood that functional units in the apparatus shown in FIG. 2 are only logical modules divided according to the functions realized, rather than limiting the implementations.

The electronic apparatus 200 may be arranged at a base station side or may be communicatively connected to a base station. It should be noted here that the electronic device 200 may be implemented as a chip or a device. For example, the electronic device 200 may function as the base station itself, and may include an external apparatus such as a memory and a transceiver (not shown). The memory may be configured to store programs executed by the base station for realizing various functions, and related data information. The transceiver may include one or more communication interfaces to support communications with different devices (such as user equipment, other base station and the like). The implementations of the transceiver are not limited here.

In an example, the acquiring unit 201 acquires the indication through the UCI. For example, the indication may be represented by an information bit of one bit added in the UCI. In a case that the information bit is 1, it is indicated that other UE is allowed to share COT of the present UE; and in a case that the information bit is 0, it is indicated that other UE is not allowed to share the COT of the present UE.

Alternatively, meanings of 0 and 1 are defined in an opposite manner. Alternatively, similar to the first embodiment, the indication may be transmitted by multiplexing the COT sharing indicator in the UCI. In a case that the COT sharing indicator is set as 1, it is indicated that the base station and other UE are allowed to share the COT of the present UE; and in a case that the COT sharing indicator is set as 0, it is indicated that the base station and other UE are not allowed to share the COT of the present UE. Alternatively, meanings of 0 and 1 are defined in an opposite manner.

In addition, the acquiring unit 201 may acquire, from the UE, at least one of duration of MCOT, maximum channel occupancy expiration time, a priority level and a time slot available for sharing of the UE, for use by the scheduling unit 202 in scheduling.

In a case that the above mentioned indication denotes that other UE and/or the base station is allowed to share the COT of the present UE, the scheduling unit 202 schedules spectrum resources which are accessed by the present UE for other UE and/or the base station, for example in remaining time of the COT of the present UE. The base station or other UE may access into the spectrum resources without performing channel detection or by just performing a simplified version of channel detection.

In addition, the scheduling unit 202 may be further configured to instruct, through downlink control information (DCI), other UE to share the COT of the present UE. In other words, the scheduling unit 202 informs other UE that the spectrum resources to be accessed into subsequently are provided for sharing by the UE which has performed channel detection, so that other UE accesses into the spectrum resources within the shared COT, without performing channel detection or by just performing a simplified version of channel detection.

Figure 3:
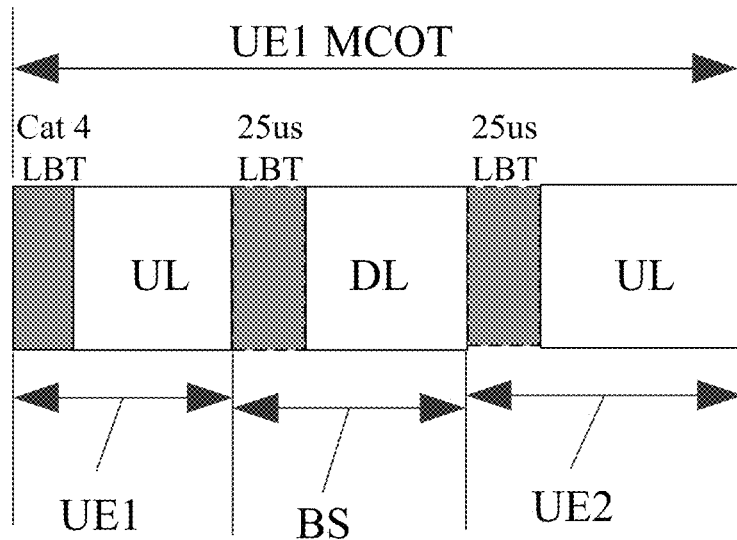
FIG. 3 shows a schematic diagram of sharing a COT of UE1 by UE2 and a base station.

In order to facilitate understanding, FIG. 3 shows a schematic diagram in which UE2 and a base station share COT of UE1. As shown in FIG. 3, UE1 successfully accesses into an unlicensed frequency band by performing Cat 4 LBT, and completes uplink transmission. The uplink transmission may be autonomous uplink transmission (AUL) or scheduled uplink transmission (SUL). In this case, the MCOT of the UE1 does not expire, and the UE1 expects to share its COT with other UE. Therefore, the UE1 informs the base station through the indication included in the UCI, for example. In the example shown in FIG. 3, the UE1 also allows the base station to share its COT. Therefore, the base station accesses into the spectrum resources of the UE1 to perform downlink transmission. FIG. 3 shows that the base station performs 25 µs LBT before performing downlink transmission, which is only an example. Alternatively, the base station may not perform LBT. Whether to perform LBT may be dependent on, for example, an interval between the uplink transmission of the UE1 and the downlink transmission of the base station. The downlink transmission of the base station such as transmitting DCI, includes feedback for the uplink transmission of the UE1, control and scheduling information for the UE2, and the like. Alternatively, the base station may also transmit downlink data. Subsequently, the UE2 accesses into the spectrum resources of the UE1 under scheduling of the base station, for performing uplink transmission. Similarly, the UE2 may perform 25 µs LBT or not perform LBT.

Figure 4:
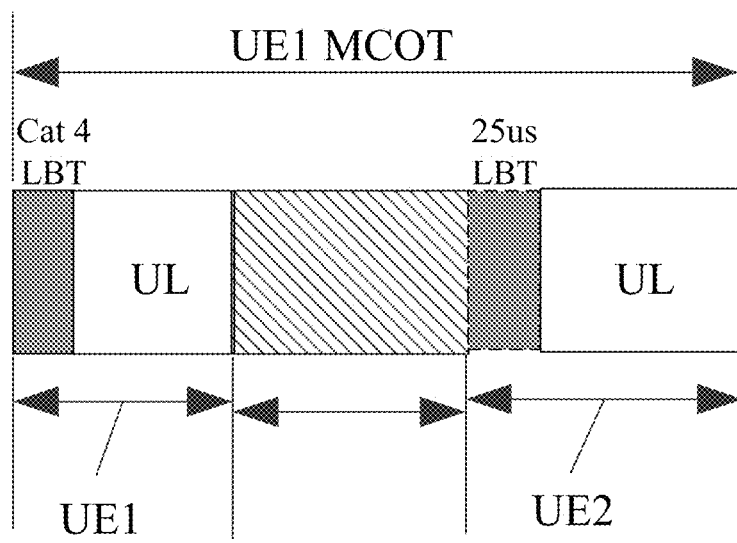
FIG. 4 shows a schematic diagram of sharing a COT of UE1 by UE2.

In addition, FIG. 4 shows a schematic diagram of sharing COT of UE1 by UE2. FIG. 4 differs from FIG. 3 in that: the base station does not share the COT of the UE1, and downlink scheduling of the UE2 may be implemented by the base station by accessing into other spectrum resources. Therefore, a part filled with oblique lines in FIG. 4 represents a time period without performing transmission.

Figure 5:
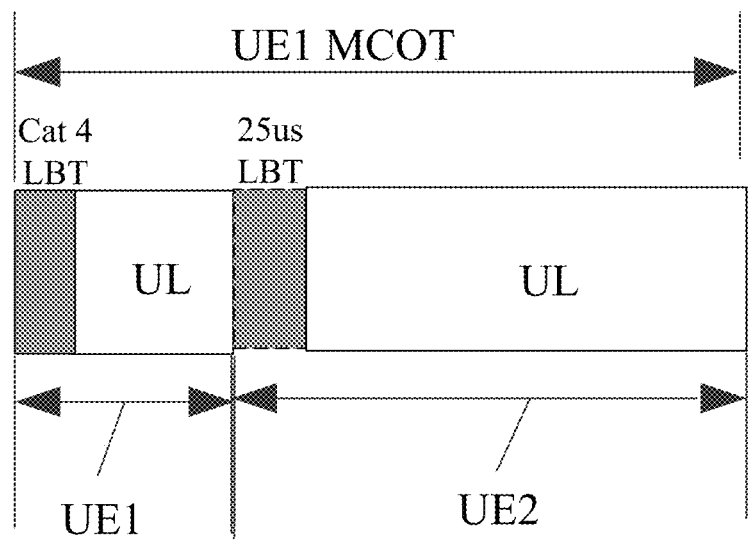
FIG. 5 shows a schematic diagram of sharing a COT of UE1 by UE2 in a case that the UE1 and the UE2 are in D2D connection.

FIG. 5 shows a schematic diagram of sharing COT of UE1 by UE2, in a case that the UE1 and the UE2 are in a D2D connection. In the example, the UE1 instructs, through SCI, the UE2 that the UE2 can share the COT of the UE1, so that the UE2 can access into the spectrum resources of the UE1 without performing LBT or by just performing 25 µs LBT.

With the electronic apparatus 200 according to the embodiment of the present disclosure, the COT can be shared among multiple UEs, thereby improving spectrum utilization efficiency of the unlicensed frequency band and reducing the latency.

Third Embodiment

Figure 6:
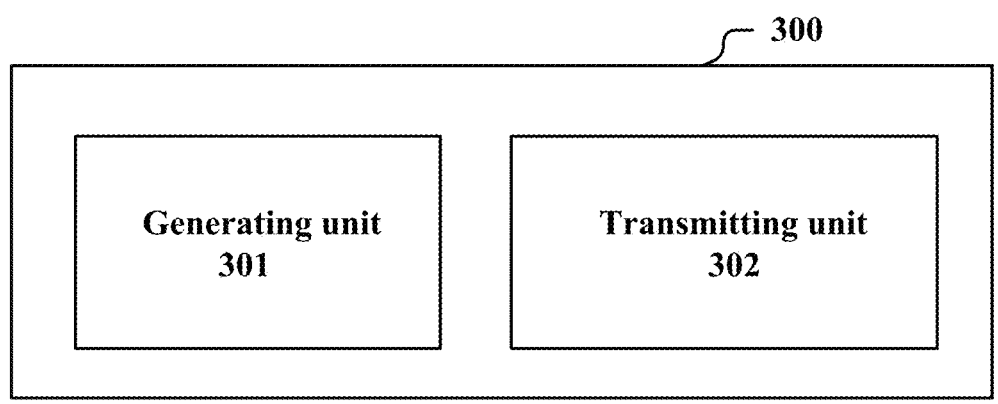
FIG. 6 shows a block diagram of functional modules of an electronic apparatus for wireless communications according to another embodiment of the present disclosure.

FIG. 6 shows a block diagram of functional modules of an electronic apparatus 300 for wireless communications according to another embodiment of the present disclosure. As shown in FIG. 6, the electronic apparatus 300 includes a generating unit 301 and a transmitting unit 302. The generating unit 301 is configured to generate, in a case that UE has accessed into an unlicensed frequency band successfully, an indication denoting whether to support multiple switching points within MCOT. The switching point indicates switching between uplink transmission and downlink transmission. The transmitting unit 302 is configured to include the indication in UCI, to be transmitted to the base station.

Similarly, the generating unit 301 and the transmitting unit 302 may be implemented by one or more processing circuitries. The processing circuitry may be implemented as a chip, for example. The electronic apparatus 300 may be arranged at a UE side or may be communicatively connected to the UE, for example.

Here, by supporting multiple switching points within the MCOT, more flexible transmission can be realized. In an example, the transmitting unit 302 is configured to add an information bit of one bit in the UCI for the above mentioned indication. In a case that the information bit is 1, it is indicated that multiple switching points are supported; and in a case that the information bit is 0, it is indicated that multiple switching points are not supported. Alternatively, indications of 0 and 1 are defined in an opposite manner. In addition, the indication may be transmitted by multiplexing a COT sharing indicator in the UCI. The COT sharing indicator denotes whether to allow the base station to transmit a control instruction by sharing the COT of the UE. For example, in a case that the COT sharing indicator is set as 1, it is indicated that multiple switching points are supported; and in a case that the COT sharing indication is set as 0, it is indicated that multiple switching points are not supported. Alternatively, indications of 0 and 1 are defined in an opposite manner.

In a case that the indication denotes that multiple switching points are supported within the MCOT, the transmitting unit 302 further transmits information of at least one of duration of the MCOT, maximum channel occupancy expiration time, a priority level and a time slot available for sharing of the UE, to the base station. The above information may be included in the UCI, for example.

In a case that the indication denotes that multiple switching points are supported, it is also indicated that the present UE allows other UE and the base station to share the COT of the present UE. Other UE and the base station access into the spectrum resources which are accessed by the present UE without performing channel detection or by just performing a simplified version of channel detection.

Figure 7:
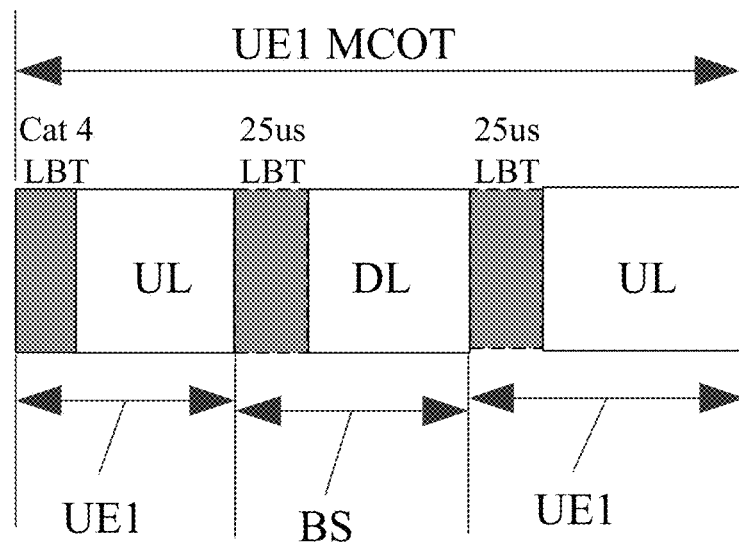
FIG. 7 shows a schematic diagram of an example in which UE1 again accesses into spectrum resources which UE1 previously accessed into.

In addition, under scheduling of the base station, the present UE may again access into the spectrum resources which are previously accessed into by the present UE within the MCOT. The UE again accesses into the spectrum resources without performing channel detection or by just performing a simplified version of channel detection. FIG. 7 shows a schematic diagram of an example in which the UE1 again accesses into spectrum resources previously accessed by the UE1. It may be seen that, after the base station performs the downlink transmission, the UE1 again accesses into the spectrum resources for performing uplink transmission. In this case, the UE1 may not perform LBT or perform 25 μs LBT. In the example shown in FIG. 7, there are two switching points. The number of switching points is not limited, and there may be more switching points.

With the electronic apparatus 300 according to the embodiment of the present disclosure, multiple switching points can be supported within the MCOT, thereby achieving more flexible utilization of the spectrum resources, and improving spectrum utilization efficiency.

Fourth Embodiment

Figure 8:
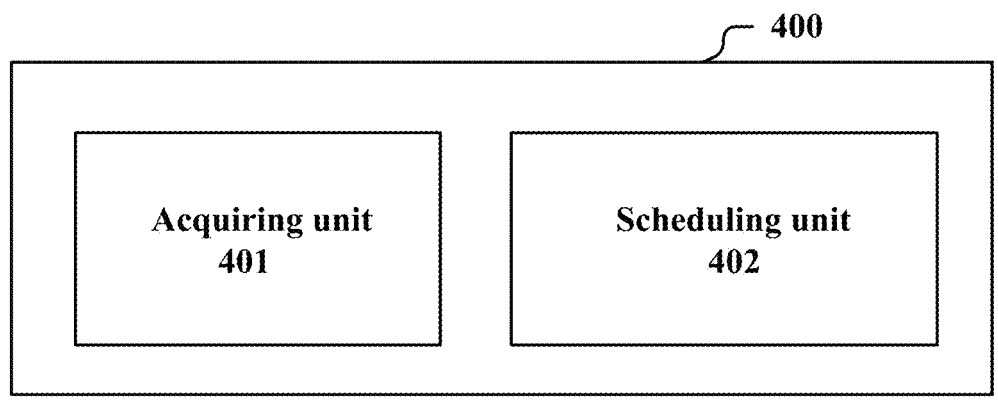
FIG. 8 shows a block diagram of functional modules of an electronic apparatus for wireless communications according to another embodiment of the present disclosure.

FIG. 8 shows a block diagram of functional modules of an electronic apparatus 400 for wireless communications according to another embodiment of the present disclosure. As shown in FIG. 8, the electronic apparatus 400 includes an acquiring unit 401 and a scheduling unit 402. The acquiring unit 401 is configured to acquire, from UE having accessed into an unlicensed frequency band successfully, an indication denoting whether to support multiple switching points within the MCOT. The switching point indicates switching between uplink transmission and downlink transmission. The scheduling unit 402 is configured to schedule the spectrum resources which are accessed by the UE within the MCOT based on the indication.

Similarly, the acquiring unit 401 and the scheduling unit 402 may be implemented by one or more processing circuitries. The processing circuitry may be implemented as a chip, for example. The electronic apparatus 400 may be arranged at a base station side or may be communicatively connected to the base station, for example.

In an example, the indication is denoted by an information bit of one bit added in the UCI. In a case that the information bit is 1, it is indicated that multiple switching points are supported; and in a case that the information bit is 0, it is indicated that multiple switching points are not supported. Alternatively, indications of 0 and 1 are defined in an opposite manner. In addition, the indication may be represented by a COT sharing indicator in the UCI. The COT sharing indicator denotes whether to allow the base station to transmit a control instruction by sharing the COT of the UE. For example, in a case that the COT sharing indicator is set as 1, it is indicated that multiple switching points are supported; and in a case that the COT sharing indication is set as 0, it is indicated that multiple switching points are not supported. Alternatively, indications of 0 and 1 are defined in an opposite manner.

In a case that the indication denotes supporting multiple switching points, the acquiring unit 401 is further configured to acquire, from the UE, information of at least one of duration of the MCOT, maximum channel occupancy expiration time, a priority level and a time slot available for sharing of the UE. The above information may be included in the UCI.

As described in the third embodiment, supporting multiple switching points indicates allowing multiple UEs to share the COT of a single UE. Accordingly, the UE for which the scheduling unit 402 schedules the spectrum resources accesses into the spectrum resources without performing channel detection or by performing a simplified version of channel detection. For example, the scheduling unit 402 is further configured to instruct, through the DCI, the scheduled UE to access into the spectrum resources within the MCOT without performing channel detection or by performing a simplified version of channel detection. In addition, as shown in FIG. 7, the scheduled UE may be the UE transmitting the indication of supporting multiple switching points, or may be other UE.

With the electronic apparatus 400 according to the embodiment, multiple switching points within the MCOT can be supported, thereby achieving more flexible utilization of the spectrum resources and improving spectrum utilization efficiency.

Fifth Embodiment

Figure 9:
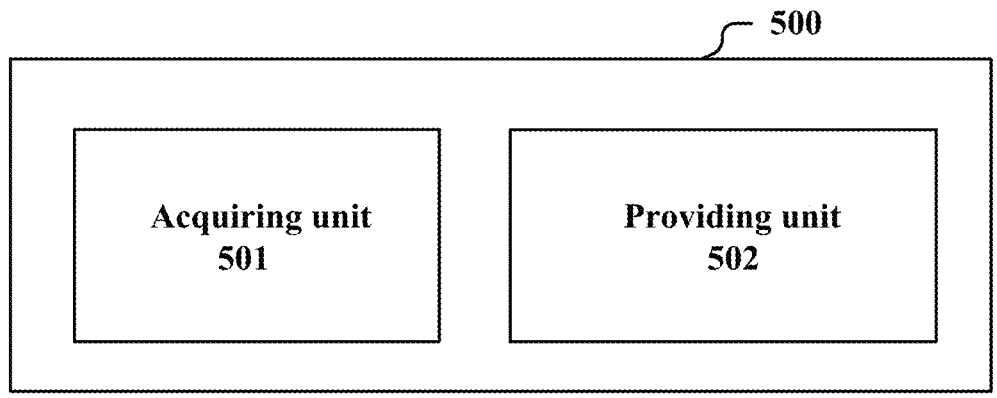
FIG. 9 shows a block diagram of functional modules of an electronic apparatus for wireless communications according to another embodiment of the present disclosure.

FIG. 9 shows a block diagram of functional modules of an electronic apparatus 500 for wireless communications according to another embodiment of the present disclosure. As shown in FIG. 9, the electronic apparatus 500 includes an acquiring unit 501 and a providing unit 502. The acquiring unit 501 is configured to acquire, in a case that a first NOMA-UE has accessed into an unlicensed frequency band successfully, COT sharing information of the first NOMA-UE. The providing unit 502 is configured to provide the COT sharing information to at least one second NOMA-UE which is to access into the same spectrum resources, so that the at least one second NOMA-UE accesses into the spectrum resources within COT of the first NOMA-UE, without performing channel detection or by just performing a simplified version of channel detection.

Similarly, the acquiring unit 501 and the providing unit 502 may be implemented by one or more processing circuitries. The processing circuitry may be implemented as a chip, for example. The electronic apparatus 500 may be arranged at a base station side or may be communicatively connected to the base station, for example.

As described above, in the NOMA architecture, multiple UEs may perform data transmission by using the same time and frequency resources. Therefore, in an unlicensed frequency band, if channel detection of the UE indicates that the channel is available, other UE using the same time and frequency resources may share the COT of the UE. That is, other UE may access into the same spectrum resources as those of the UE within the COT of the UE without performing channel detection or by performing a simplified version of channel detection. It should be understood that, the first NOMA-UE and the second NOMA-UE in the embodiment are only for distinguishing the NOMA-UE providing the COT sharing from the NOMA-UE performing COT sharing (that is, sharing the COT of other UE), and do not have the meaning in the order or other aspects.

Accordingly, the acquiring unit 501 acquires, from the first NOMA-UE having successfully accessed into the unlicensed frequency band, its COT sharing information. In an example, the COT sharing information may include one or more of: duration of the MCOT, maximum channel occupancy expiration time, a priority level and a time slot available for sharing. The COT sharing information may be included in the UCI, for example.

The providing unit 502 may be configured to provide the COT sharing information at least one second NOMA-UE through physical downlink control channel (PDCCH) or a broadcast channel. In a case that the COT sharing information is provided through the PDCCH, the COT sharing information may be included in DCI, for example. In a case that the COT sharing information is provided through the broadcast channel, the COT sharing information may be included in a broadcast message, for example.

The at least one second NOMA-UE and the first NOMA-UE may try to access into the unlicensed frequency band simultaneously, or the at least one second NOMA-UE may try to access into the unlicensed frequency band after the first NOMA-UE does. In other words, the base station may simultaneously schedule the same spectrum resources for the first NOMA-UE and the at least one second NOMA-UE, or the base station may schedule the spectrum resources for the first NOMA-UE and then schedules the spectrum resources for the at least one second NOMA-UE.

Figure 10:
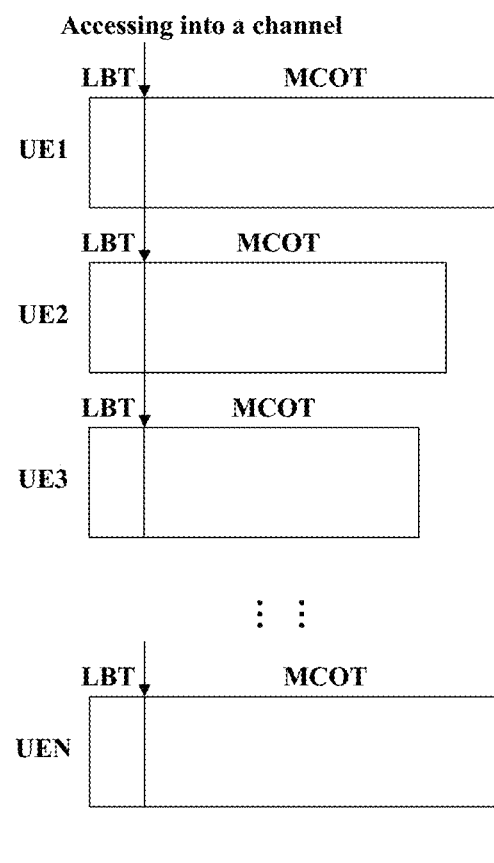
FIG. 10 shows an example of operations of respective NOMA-UEs in a case of trying to access simultaneously.

In a case that the at least one second NOMA-UE and the first NOMA-UE try to access into the unlicensed frequency band simultaneously, these NOMA-UEs may perform channel detection simultaneously, for example. In order to facilitate understanding, FIG. 10 shows an example of operations of respective NOMA-UEs in a case of trying to access simultaneously. In FIG. 10, there are N UEs in total trying to access simultaneously.

For example and being not limited, the first NOMA-UE (UE1 shown in FIG. 10) first successfully performs the channel detection (LBT shown in FIG. 10), that is, its LBT result indicates that the channel is idle. The first NOMA-UE first accesses into the unlicensed frequency band successfully. According to the embodiment, the first NOMA-UE provides its COT sharing information to the acquiring unit 501. The providing unit 502 provides the COT sharing information to other NOMA-UE subsequently, i.e., at least one second NOMA-UE (UE2 to UEN shown in FIG. 10). The at least one second NOMA-UE accesses into the scheduled spectrum resources according to the COT sharing information, without performing channel detection or by just performing a simplified version of channel detection.

In addition, although the example in which the providing unit 502 provides the COT sharing information to the at least one second NOMA-UE is described herein, the present disclosure is not limited to the example. Alternatively, the providing unit 502 may be further configured to provide information instructing accessing to at least one second NOMA-UE. Upon receiving the information instructing accessing, the at least one second NOMA-UE may access into the scheduled spectrum resources without performing channel detection or by just performing a simplified version of channel detection. It may be seen from FIG. 10 that, the MCOT of each of UE2 to UEN may be less than or equal to the MCOT of UE1.

In order to further improve the efficiency, the providing unit 502 is further configured to instruct the first NOMA-UE and the at least one second NOMA-UE to set a timer. In a case that the first NOMA-UE fails to access into the unlicensed frequency band when the timer expires, the at least one second NOMA-UE determines not to share the COT. In other words, after the timer expires, the at least one second NOMA-UE does not share the COT of other NOMA-UE. A timing duration of the timer may be specified by the providing unit 502, for example. In addition, in order to achieve the function, the providing unit 502 may set a timer at the base station side. In a case that the timer has expired when receiving the COT sharing information, the providing unit 502 does not provide the COT sharing information and/or information instructing accessing to any NOMA-UE.

In another example, the providing unit 502 is further configured to indicate a type of channel detection to be performed to the first NOMA-UE and the at least one second NOMA-UE. The first NOMA-UE is instructed to perform complete channel detection, and the at least one second NOMA-IE is instructed to perform a simplified version of channel detection or not perform channel detection. The providing unit 502 may indicate a type of channel detection to be performed according to capability of the NOMA-UE, or indicate randomly.

Still referring to the example shown in FIG. 10, for example, UE1 is instructed to perform complete LBT, and other UEs are instructed to perform 25 µs LBT or not perform LBT (that is, LBT of UE2 to UEN in FIG. 10 may be omitted or differs from the LBT of UE1 in type). In this case, the at least one second NOMA-UE waits until channel detection of the first NOMA-UE is completed, and acquires the COT sharing information from the first NOMA-UE via the base station.

Similarly, in order to further improve the efficiency, the providing unit 502 may also be configured to instruct the first NOMA-UE and the at least one second NOMA-UE to set a timer. In a case that the first NOMA-UE fails to access into the unlicensed frequency band when the timer expires, the at least one second NOMA-UE determines not to perform COT sharing. Alternatively, in order to realize the function, the providing unit 502 may set a timer at the base station side. In a case that the timer has expired when receiving the COT sharing information, the providing unit 502 does not provide the COT sharing information and/or information instructing accessing to any NOMA-UE. In this case, the at least one second NOMA-UE performs the channel detection by itself.

Figure 11:
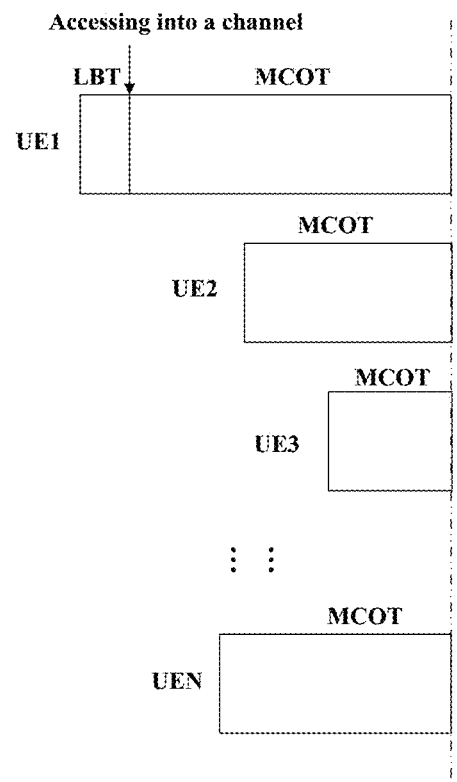
FIG. 11 shows an example of operations of respective NOMA-UEs in a case of not trying to access simultaneously.

In another scenario, the first NOMA-UE first tries to access into the unlicensed frequency band, and then the at least one second NOMA-UE tries to access into the unlicensed frequency band. In other words, the base station schedules the first NOMA-UE and the at least one second NOMA-UE at different timings. FIG. 11 shows an example of operations of respective NOMA-UEs in a case of not trying to access simultaneously.

In the example shown in FIG. 11, UE1 first performs LBT and accesses into a channel successfully. After a time period, UEN, UE3 and UE2 are to access into the channel successively. Within the MCOT of UE1, UE2 to UEN may directly access into the channel without performing the LBT.

Accordingly, an apparatus at a NOMA-UE side is also provided according to the embodiment of the present disclosure. The apparatus may include a providing unit configured to provide COT sharing information to the base station in a case that channel detection indicates that the channel is idle. In addition, the apparatus at the NOMA-UE side may further include an acquiring unit, configured to acquire the COT sharing information or information instructing accessing from the base station, so as to access into the spectrum resources without performing channel detection or by just performing a simplified version of channel detection.

In an example, the apparatus at the NOMA-UE side further includes a timer, configured to start the timer after receiving scheduling from the base station and start channel detection when the timer expires.

Similarly, the providing unit, the acquiring unit and the timer each may be implemented by one or more processing circuitries. The processing circuitry may be implemented as a chip, for example.

With the electronic apparatus 500 according to the embodiment, the COT can be shared among multiple NOMA-UEs for which the same spectrum resources are scheduled.

Sixth Embodiment

Figure 12:
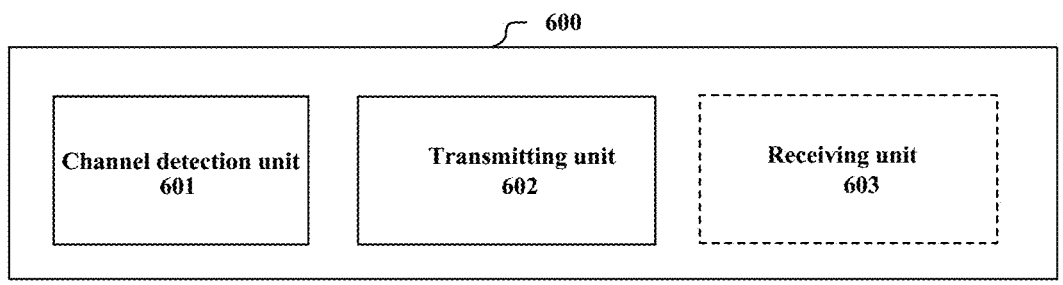
FIG. 12 shows a block diagram of functional modules of an electronic apparatus for wireless communications according to another embodiment of the present disclosure.

FIG. 12 shows a block diagram of functional modules of an electronic apparatus 600 for wireless communications according to another embodiment of the present disclosure. As shown in FIG. 12, the electronic apparatus 600 includes a channel detection unit 601, and a transmitting unit 602. The channel detection unit 601 is configured to cause the first NOMA-UE where the electronic apparatus 600 is located to try to access to the unlicensed frequency band via channel detection. The transmitting unit 602 is configured to transmit, in a case that the first NOMA-UE successfully accesses into the unlicensed frequency band, COT sharing information of the first NOMA-UE to at least one second NOMA-UE through PSCCH. The at least one second NOMA-UE accesses into spectrum resources the same as those of the first NOMA-UE within the COT of the first NOMA-UE based on the COT sharing information, without performing channel detection or by just performing a simplified version of channel detection.

Similarly, the channel detection unit 601 and the transmitting unit 602 may be implemented by one or more processing circuitries. The processing circuitry may be implemented as a chip for example. The electronic device 600 may be arranged at a UE side or may be communicatively connected to the UE, for example.

The sixth embodiment differs from the fifth embodiment in that: the first NOMA-UE transmits the COT sharing information to the at least one second NOMA-UE through a sidelink in D2D communication. Therefore, the COT sharing information is transmitted through PSCCH.

For example, the COT sharing information may be included in SCI for transmission. For example, the COT sharing information may include one or more of: duration of the MCOT, maximum channel occupancy expiration time, a priority level and a time slot available for sharing. In addition, the COT sharing information may further include information of spectrum resources corresponding to the shared COT.

In the D2D scenario, PSCCH transmission is performed by using resources selected from a predetermined resource pool, and time and frequency resources are allocated to the UE to transmit or detect PSCCH. If the at least one second NOMA-UE receives the COT sharing information from UE1 when detecting PSCCH, the at least one second NOMA-UE may access into corresponding time and frequency resources to start uplink transmission, without performing channel detection or by just performing a simplified version of channel detection.

As shown by a dotted line block in FIG. 12, the electronic apparatus 600 may further include a receiving unit 603, configured to receive sharing information from the second NOMA-UE through PSCCH. Further, the electronic apparatus 600 accesses into the spectrum resources based on the sharing information, without performing channel detection or by just performing a simplified version of channel detection. The electronic apparatus according to the embodiment can be applied to two scenarios shown above with reference to FIG. 10 and FIG. 11, i.e., trying to access simultaneously or not trying to access simultaneously.

With the electronic apparatus 600 according to the embodiment, the COT can be shared among multiple NOMA-UEs for which the same spectrum resources are scheduled.

Seventh Embodiment

In the process of describing the electronic apparatus for wireless communications in the embodiments described above, obviously, some processing and methods are also disclosed. Hereinafter, an overview of the methods is given without repeating some details disclosed above. However, it should be noted that, although the methods are disclosed in a process of describing the electronic apparatus for wireless communications, the methods do not certainly employ or are not certainly executed by the aforementioned components. For example, the embodiments of the electronic apparatus for wireless communications may be partially or completely implemented with hardware and/or firmware, the methods for wireless communications described below may be executed by a computer-executable program completely, although the hardware and/or firmware of the electronic apparatus for wireless communications can also be used in the methods.

Figure 13:
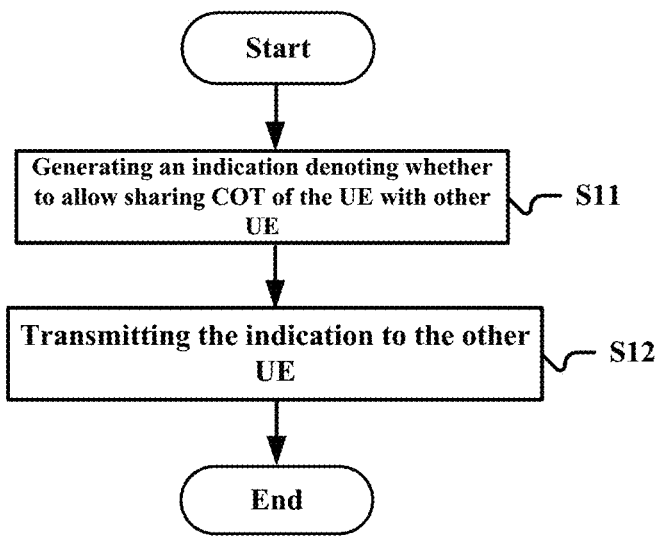
FIG. 13 shows a flowchart of a method for wireless communications according to an embodiment of the present disclosure.

FIG. 13 shows a flowchart of a method for wireless communications according to an embodiment of the present disclosure. As shown in FIG. 13, the method includes: generating, in a case that UE has accessed into an unlicensed frequency band successfully, indication denoting whether to allow sharing of COT of the UE with other UE (S11); and transmitting the indication to a base station or the other UE (S12). The method may be performed at a UE side for example.

For example, the sharing includes that other UE accesses into spectrum resources which are accessed by the UE within the COT of the UE, without performing channel detection or by just performing a simplified version of channel detection.

The indication may be included in UCI, to be transmitted to the base station. For example, an information bit of one bit may be added in the UCI for the indication. The indication may also be transmitted by multiplexing the COT sharing indicator in the UCI. The COT sharing indicator denotes whether to allow the base station to transmit control signaling by sharing the COT of the UE.

In addition, in a case that other UE is allowed to share the COT of the UE, at least one of duration of MCOT, maximum channel occupancy expiration time, a priority level and a time slot available for sharing of the UE is transmitted to the base station or other UE. The above information may be included in the UCI to be transmitted to the base station.

In another example, the indication and/or the above information may be transmitted to other UE through PSCCH. For example, the indication and/or the above information may be included in SCI for transmission.

Figure 14:
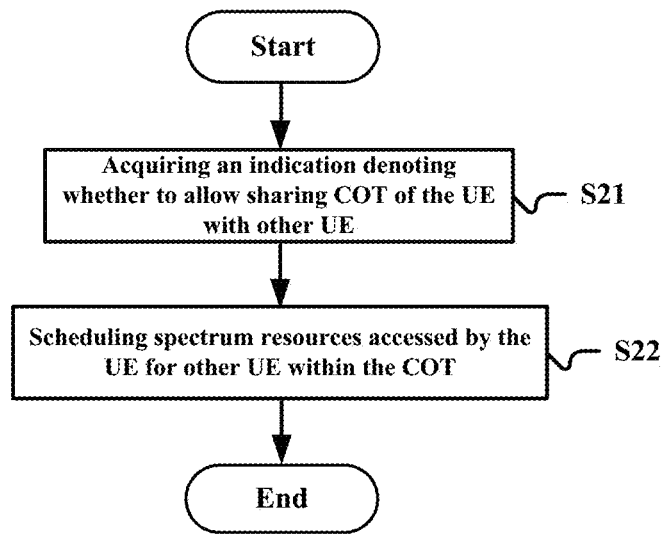
FIG. 14 shows a flowchart of a method for wireless communications according to another embodiment of the present disclosure.

FIG. 14 shows a flowchart of a method for wireless communications according to another embodiment of the present disclosure. As shown in FIG. 14, the method includes: acquiring, from UE having successfully accessed into an unlicensed frequency band, an indication denoting whether to allow other UE to share COT of the UE (S21); and scheduling spectrum resources accessed by the UE for the other UE within the COT, in a case that the indication denotes that other UE is allowed to share the COT of the UE (S21). The method may be performed at the base station side.

For example, the indication may be represented by an information bit of one bit added in the UCI. Alternatively, the indication may be represented by multiplexing a COT sharing indicator in the UCI. The COT sharing indicator denotes whether to allow the base station to transmit control signaling by sharing the COT of the UE.

In addition, although not shown in FIG. 14, the method may further include: instructing, through the DCI, other UE to share the COT of the UE, so that other UE accesses into the spectrum resources within the COT of the UE, without performing channel detection or by just performing a simplified version of channel detection.

Figure 15:
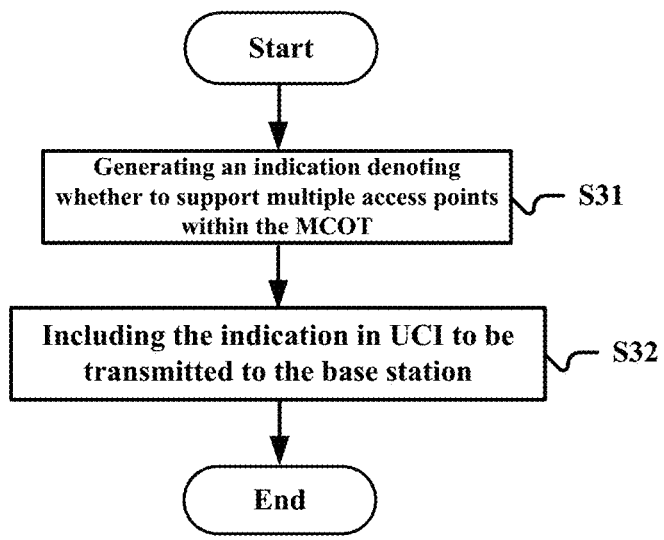
FIG. 15 shows a flowchart of a method for wireless communications according to another embodiment of the present disclosure.

FIG. 15 shows a flowchart of a method for wireless communications according to another embodiment of the present disclosure. As shown in FIG. 15, the method includes: generating, in a case that the UE has accessed into an unlicensed frequency band successfully, an indication denoting whether to support multiple switching points within the MCOT (S31), where the switching point indicates switching between uplink transmission and downlink transmission; and including the indication in UCI to be transmitted to the base station (S32). The method may be performed at a UE side, for example.

For example, an information bit of one bit may be added in the UCI for the indication, and the indication may be transmitted by multiplexing a COT sharing indicator in UCI. The COT sharing indicator denotes whether to allow the base station to transmit control signaling by sharing the COT of the UE.

Although not shown in FIG. 15, the method may further include: accessing again into the spectrum resources which are accessed previously by the UE within the MCOT under scheduling of the base station. The spectrum resources may be accessed again without performing channel detection or by just performing a simplified version of channel detection.

In a case that the indication denotes supporting multiple switching points within the MCOT, in step S32, information of at least one of duration of the MCOT, maximum channel occupancy expiration time, a priority level and switching points of the UE is transmitted to the base station.

Figure 16:
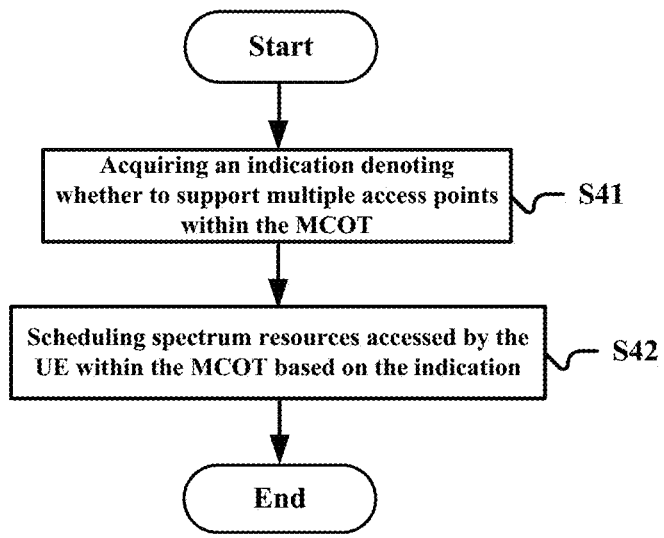
FIG. 16 shows a flowchart of a method for wireless communications according to another embodiment of the present disclosure.

FIG. 16 shows a flowchart of a method for wireless communications according to another embodiment of the present disclosure. As shown in FIG. 16, the method includes: acquiring, from UE having accessed into an unlicensed frequency band successfully, an indication denoting whether to support multiple switching points within the MCOT (S41), where the switching point indicates switching between uplink transmission and downlink transmission; and scheduling spectrum resources accessed by the UE within the MCOT based on the indication (S42). The method may be performed at the base station side.

Similarly, the indication may be represented by an information bit of one bit added in the UCI, or may be represented by a COT sharing indicator in the UCI.

In addition, the method may further include: instructing, through the DCI, a scheduled UE to access into the spectrum resources within the MCOT, without performing channel detection or by performing a simplified version of channel detection.

Figure 17:
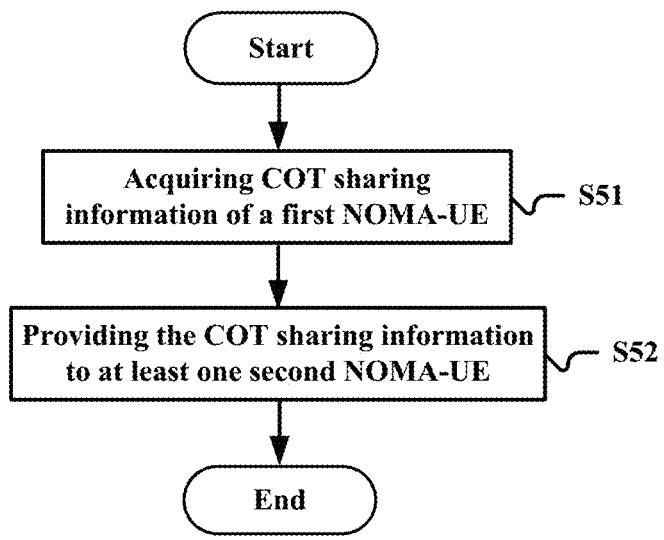
FIG. 17 shows a flowchart of a method for wireless communications according to another embodiment of the present disclosure.

FIG. 17 shows a flowchart of a method for wireless communications according to another embodiment of the present disclosure. As shown in FIG. 17, the method includes: acquiring, in a case that a first NOMA-UE accesses into an unlicensed frequency band successfully, COT sharing information of the first NOMA-UE (S51); and providing the COT sharing information to at least one second NOMA-UE which is to access into the same spectrum resources, so that the at least one second NOMA-UE accesses into the spectrum resources within the COT of the first NOMA-UE without performing channel detection or by just performing a simplified version of channel detection (S52). The method may be performed at the base station side.

In step S52, the COT sharing information may be provided to the at least one second NOMA-UE through PDCCH or a broadcast channel. For example, the COT sharing information may include one or more of: duration of the MCOT, maximum channel occupancy expiration time, a priority level and a time slot available for sharing.

In an example, the first NOMA-UE and at least one second NOMA-UE try to access into the unlicensed frequency band simultaneously. A type of channel detection to be performed may be instructed to the first NOMA-UE and the at least one second NOMA-UE. The first NOMA-UE is instructed to perform complete channel detection, and the at least one second NOMA-UE is instructed to perform a simplified version of channel detection or not perform the channel detection.

Although not shown in FIG. 17, the method may further include: instructing the first NOMA-UE and the at least one second NOMA-UE to set a timer, where in a case that the first NOMA-UE fails to access into the unlicensed frequency band when the timer expires, the at least one second NOMA-UE determines not to share the channel occupancy time.

Figure 18:
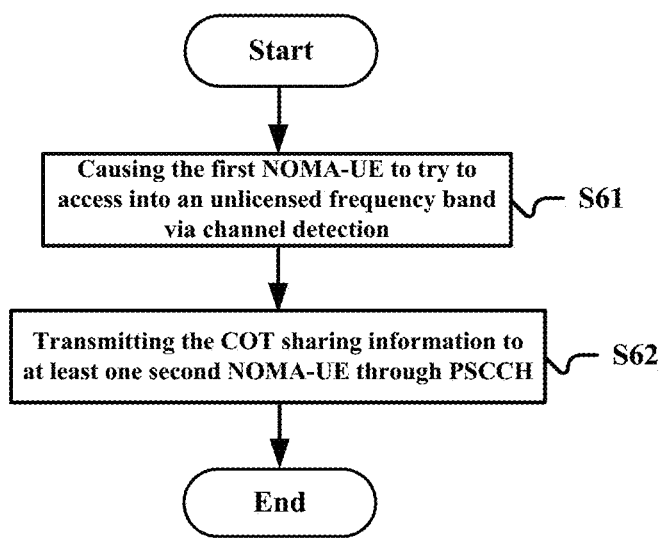
FIG. 18 shows a flowchart of a method for wireless communications according to another embodiment of the present disclosure.

FIG. 18 shows a flowchart of a method for wireless communications according to another embodiment of the present disclosure. As shown in FIG. 18, the method includes: causing the first NOMA-UE to try to access into the unlicensed frequency band via channel detection (S61); and in a case that the first NOMA-UE successfully accesses into the unlicensed frequency band, transmitting COT sharing information of the first NOMA-UE to at least one second NOMA-UE through PSCCH (S62), where the at least one second NOMA-UE accesses into spectrum resources the same as those of the first NOMA-UE within the COT of the first NOMA-UE based on the COT sharing information, without performing channel detection or by just performing a simplified version of channel detection. The method may be performed at the UE side.

For example, the COT sharing information may include one or more of: duration of the MCOT, maximum channel occupancy expiration time, a priority level and a time slot available for sharing.

It should be noted that, the above methods may be used in combination or independently, details thereof are described in the first to sixth embodiments, and are not repeated herein.

The technology of the present disclosure may be applied to various products.

For example, the electronic apparatus 200, 400 and 500 may be implemented as various base stations. The base station may be implemented as any type of evolved node B (eNB) or gNB (a 5G base station). The eNB includes, for example, a macro eNB and a small eNB. The small eNB may be an eNB covering a cell smaller than a macro cell, such as a pico eNB, a micro eNB, and a home (femto) eNB. The case for the gNB is similar to the above. Alternatively, the base station may be implemented as any other type of base station, such as a NodeB and a base transceiver station (BTS). The base station may include: a main body (also referred to as a base station apparatus) configured to control wireless communication; and one or more remote radio head ends (RRH) located at positions different from the main body. In addition, various types of user equipments may each serve as a base station by performing functions of the base station temporarily or semi-permanently.

The electronic apparatus 100, 300 and 600 may be implemented as various user equipments. The user equipment may be implemented as a mobile terminal (such as a smartphone, a tablet personal computer (PC), a notebook PC, a portable game terminal, a portable/dongle-type mobile router, and a digital camera device) or an in-vehicle terminal such as a car navigation apparatus. The user equipment may also be implemented as a terminal (also referred to as a machine type communication (MTC) terminal) that performs machine-to-machine (M2M) communication. In addition, the user equipment may be a wireless communication module (such as an integrated circuit module including a single chip) mounted on each of the terminals described above.

Application Example Regarding a Base Station

First Application Example

Figure 19:
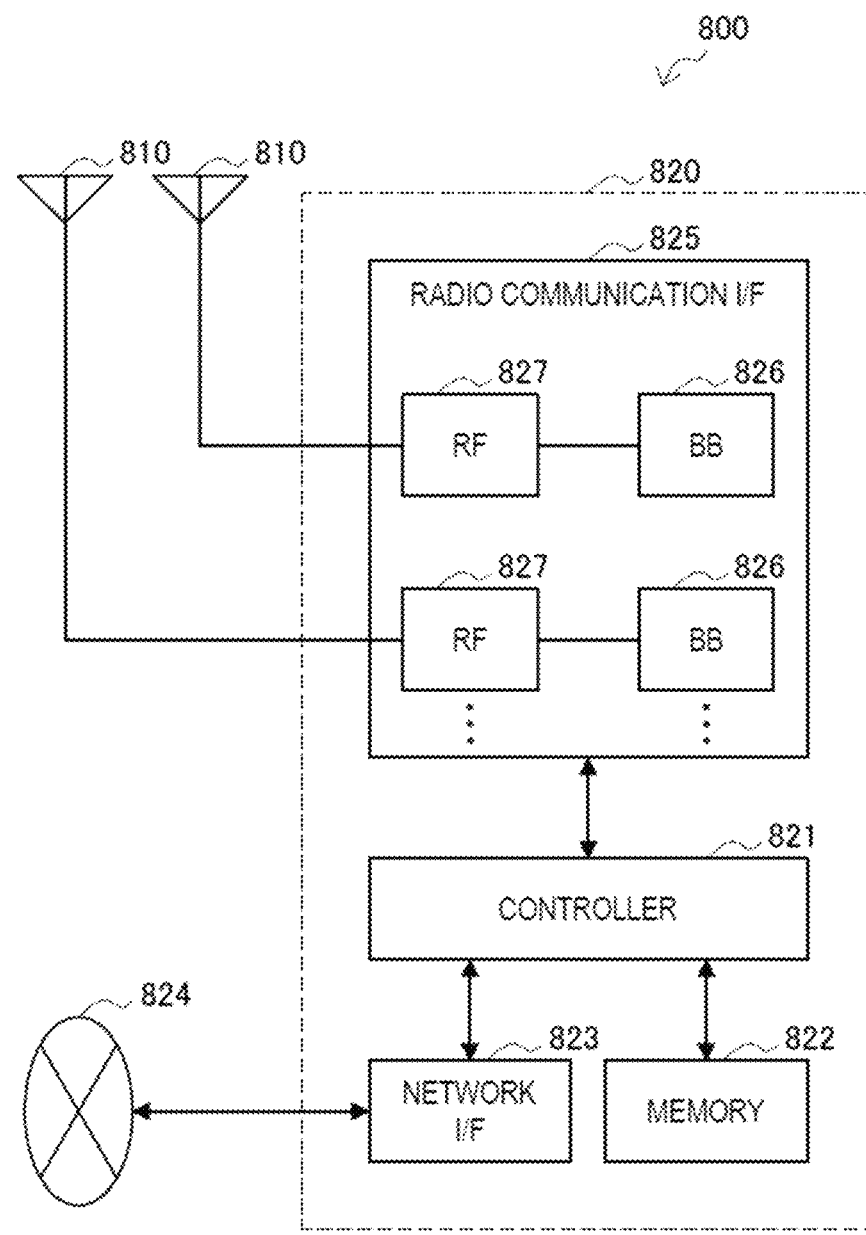
FIG. 19 is a block diagram showing a first example of an exemplary configuration of an eNB or gNB to which the technology according to the present disclosure may be applied.

FIG. 19 is a block diagram showing a first example of an exemplary configuration of an eNB or gNB to which technology according to the present disclosure may be applied. It should be noted that the following description is given by taking the eNB as an example, which is also applicable to the gNB. An eNB 800 includes one or more antennas 810 and a base station apparatus 820. The base station apparatus 820 and each of the antennas 810 may be connected to each other via a radio frequency (RF) cable.

Each of the antennas 810 includes a single or multiple antennal elements (such as multiple antenna elements included in a multiple-input multiple-output (MIMO) antenna), and is used for the base station apparatus 820 to transmit and receive wireless signals. As shown in FIG. 19, the eNB 800 may include the multiple antennas 810. For example, the multiple antennas 810 may be compatible with multiple frequency bands used by the eNB 800. Although FIG. 19 shows the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control and scheduling. The control may be performed in corporation with an eNB or a core network node in the vicinity. The memory 822 includes a RAM and a ROM, and stores a program executed by the controller 821 and various types of control data (such as terminal list, transmission power data and scheduling data).

The network interface 823 is a communication interface for connecting the base station apparatus 820 to a core network 824. The controller 821 may communicate with a core network node or another eNB via the network interface 823. In this case, the eNB 800, and the core network node or another eNB may be connected to each other via a logic interface (such as an S1 interface and an X2 interface). The network interface 823 may also be a wired communication interface or a wireless communication interface for wireless backhaul. If the network interface 823 is a wireless communication interface, the network interface 823 may use a higher frequency band for wireless communication than that used by the radio communication interface 825.

The radio communication interface 825 supports any cellular communication scheme (such as Long Term Evolution (LTE) and LTE-advanced), and provides wireless connection to a terminal located in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, Media Access Control (MAC), Radio Link Control (RLC), and a Packet Data Convergence Protocol (PDCP)). The BB processor 826 may have a part or all of the above-described logical functions instead of the controller 821. The BB processor 826 may be a memory storing communication control programs, or a module including a processor and a related circuit configured to execute the programs. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives wireless signals via the antenna 810.

As shown in FIG. 19, the radio communication interface 825 may include the multiple BB processors 826. For example, the multiple BB processors 826 may be compatible with multiple frequency bands used by the eNB 800. The radio communication interface 825 may include multiple RF circuits 827, as shown in FIG. 19. For example, the multiple RF circuits 827 may be compatible with multiple antenna elements. Although FIG. 19 shows the example in which the radio communication interface 825 includes the multiple BB processors 826 and the multiple RF circuits 827, the radio communication interface 825 may also include a single BB processor 826 and a single RF circuit 827.

In the eNB 800 shown in FIG. 19, transceivers of the electronic apparatus 200, 400 and 500 may be implemented by the radio communication interface 825. At least a part of functions may be implemented by the controller 821. For example, the controller 21 can share the COT of the UE having successfully accessed to the unlicensed frequency band by performing functions of the acquiring unit 201 and the scheduling unit 202, can support multiple switching points within the MCOT by performing functions of the acquiring unit 401 and the scheduling unit 402, and can share the COT among multiple NOMA-UEs by performing functions of the acquiring unit 501 and the providing unit 502.

Second Application Example

Figure 20:
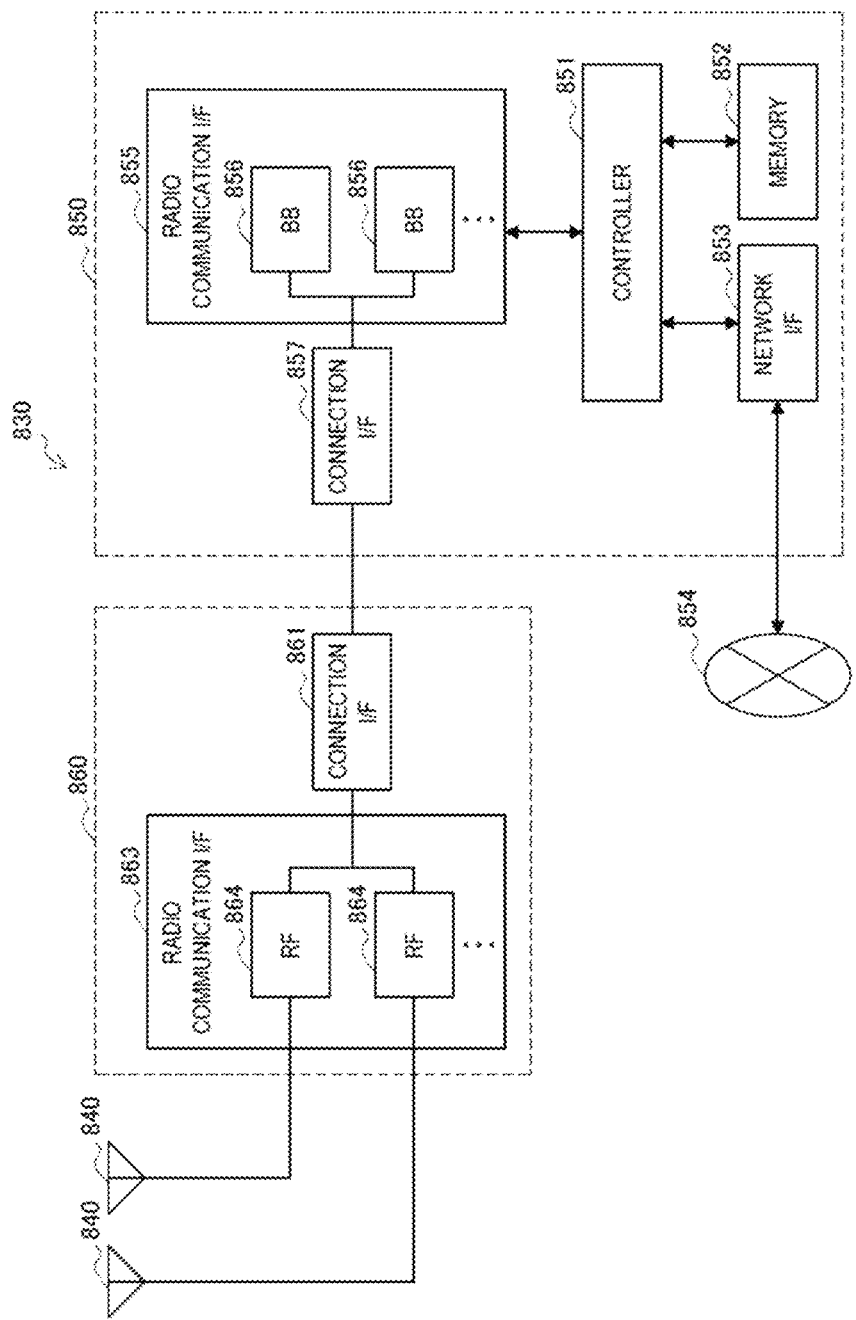
FIG. 20 is a block diagram showing a second example of an exemplary configuration of the eNB or gNB to which the technology according to the present disclosure may be applied.

FIG. 20 is a block diagram showing a second example of the exemplary configuration of an eNB or gNB to which the technology according to the present disclosure may be applied. It should be noted that the following description is given by taking the eNB as an example, which is also applied to the gNB. An eNB 830 includes one or more antennas 840, a base station apparatus 850, and an RRH 860. The RRH 860 and each of the antennas 840 may be connected to each other via an RF cable. The base station apparatus 850 and the RRH 860 may be connected to each other via a high speed line such as an optical fiber cable.

Each of the antennas 840 includes a single or multiple antennal elements (such as multiple antenna elements included in an MIMO antenna), and is used for the RRH 860 to transmit and receive wireless signals. As shown in FIG. 20, the eNB 830 may include the multiple antennas 840. For example, the multiple antennas 840 may be compatible with multiple frequency bands used by the eNB 830. Although FIG. 20 shows the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 19.

The radio communication interface 855 supports any cellular communication scheme (such as LTE and LTE-advanced), and provides wireless communication to a terminal located in a sector corresponding to the RRH 860 via the RRH 860 and the antenna 840. The radio communication interface 855 may typically include, for example, a BB processor 856. The BB processor 856 is the same as the BB processor 826 described with reference to FIG. 19, except that the BB processor 856 is connected to an RF circuit 864 of the RRH 860 via the connection interface 857. As show in FIG. 20, the radio communication interface 855 may include the multiple BB processors 856. For example, the multiple BB processors 856 may be compatible with multiple frequency bands used by the eNB 830. Although FIG. 20 shows the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives wireless signals via the antenna 840. The radio communication interface 863 may typically include, for example, the RF circuit 864. The RF circuit 864 may include, for example, a mixer, a filter and an amplifier, and transmits and receives wireless signals via the antenna 840. The radio communication interface 863 may include multiple RF circuits 864, as shown in FIG. 20. For example, the multiple RF circuits 864 may support multiple antenna elements. Although FIG. 20 shows the example in which the radio communication interface 863 includes the multiple RF circuits 864, the radio communication interface 863 may also include a single RF circuit 864.

In the eNB 830 shown in FIG. 20, transceivers of the electronic apparatus 200, 400 and 500 may be implemented by the radio communication interface 855 and/or radio communication interface 863. At least a part of functions may be implemented by the controller 851. For example, the controller 851 can share the COT of the UE having successfully accessed to the unlicensed frequency band by performing functions of the acquiring unit 201 and the scheduling unit 202, can support multiple switching points within the MCOT by performing functions of the acquiring unit 401 and the scheduling unit 402, and can share the COT among multiple NOMA-UEs by performing functions of the acquiring unit 501 and the providing unit 502.

Application Example Regarding User Equipment

First Application Example

Figure 21:
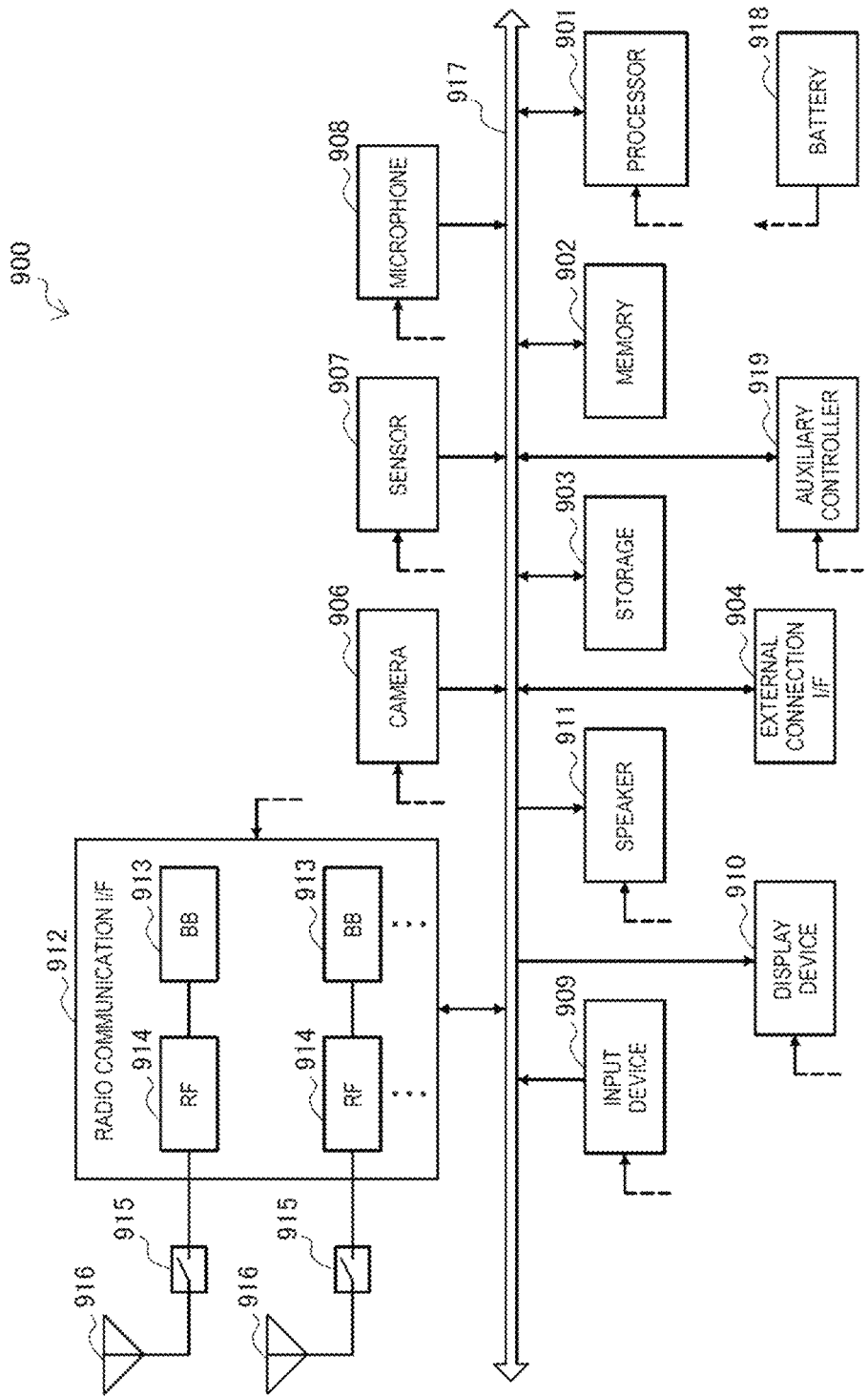
FIG. 21 is a block diagram showing an example of an exemplary configuration of a smartphone to which the technology according to the present disclosure may be applied.

FIG. 21 is a block diagram showing an exemplary configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes a RAM and a ROM, and stores a program executed by the processor 901 and data. The storage 903 may include a storage medium such as a semiconductor memory and a hard disk. The external connection interface 904 is an interface for connecting an external device (such as a memory card and a universal serial bus (USB) device) to the smartphone 900.

The camera 906 includes an image sensor (such as a charge coupled device (CCD) and a complementary metal oxide semiconductor (CMOS)), and generates a captured image. The sensor 907 may include a group of sensors, such as a measurement sensor, a gyro sensor, a geomagnetism sensor, and an acceleration sensor. The microphone 908 converts sounds that are inputted to the smartphone 900 to audio signals. The input device 909 includes, for example, a touch sensor configured to detect touch onto a screen of the display device 910, a keypad, a keyboard, a button, or a switch, and receives an operation or information inputted from a user. The display device 910 includes a screen (such as a liquid crystal display (LCD) and an organic light-emitting diode (OLED) display), and displays an output image of the smartphone 900. The speaker 911 converts audio signals that are outputted from the smartphone 900 to sounds.

The radio communication interface 912 supports any cellular communication scheme (such as LTE and LTE-advanced), and performs a wireless communication. The radio communication interface 912 may include, for example, a BB processor 913 and an RF circuit 914. The BB processor 913 may perform, for example, encoding/decoding, modulating/demodulating, and multiplexing/de-multiplexing, and perform various types of signal processing for wireless communication. The RF circuit 914 may include, for example, a mixer, a filter and an amplifier, and transmits and receives wireless signals via the antenna 916. It should be noted that although FIG. 21 shows a case that one RF link is connected to one antenna, which is only illustrative, and a case that one RF link is connected to multiple antennas through multiple phase shifters may also exist. The radio communication interface 912 may be a chip module having the BB processor 913 and the RF circuit 914 integrated thereon. The radio communication interface 912 may include multiple BB processors 913 and multiple RF circuits 914, as shown in FIG. 21. Although FIG. 21 shows the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of wireless communication scheme such as a short-distance wireless communication scheme, a near field communication scheme, and a radio local area network (LAN) scheme. In this case, the radio communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the radio communication interface 912.

Each of the antennas 916 includes a single or multiple antenna elements (such as multiple antenna elements included in an MIMO antenna) and is used for the radio communication interface 912 to transmit and receive wireless signals. The smartphone 900 may include the multiple antennas 916, as shown in FIG. 21. Although FIG. 21 shows the example in which the smartphone 900 includes the multiple antennas 916, the smartphone 900 may also include a single antenna 916.

Furthermore, the smartphone 900 may include the antenna 916 for each wireless communication scheme. In this case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smart phone 900 shown in FIG. 21 via feeder lines that are partially shown as dashed lines in FIG. 21. The auxiliary controller 919, operates a minimum necessary function of the smart phone 900, for example, in a sleep mode.

In the smart phone 900 shown in FIG. 21, transceivers of the electronic apparatus 100, 300 and 600 may be implemented by the radio communication interface 912. At least a part of functions may be implemented by the processor 901 or the auxiliary controller 919. For example, the processor 901 or the auxiliary controller 919 can achieve the function of allowing other UE to share the COT of the present UE by performing functions of the generating unit 101 and the transmitting unit 102, can support multiple switching points within the MCOT by performing functions of the generating unit 301 and the transmitting unit 302, and can share the COT among multiple NOMA-UEs by performing functions of the channel detection unit 601 and the transmitting unit 602.

Second Application Example

Figure 22:
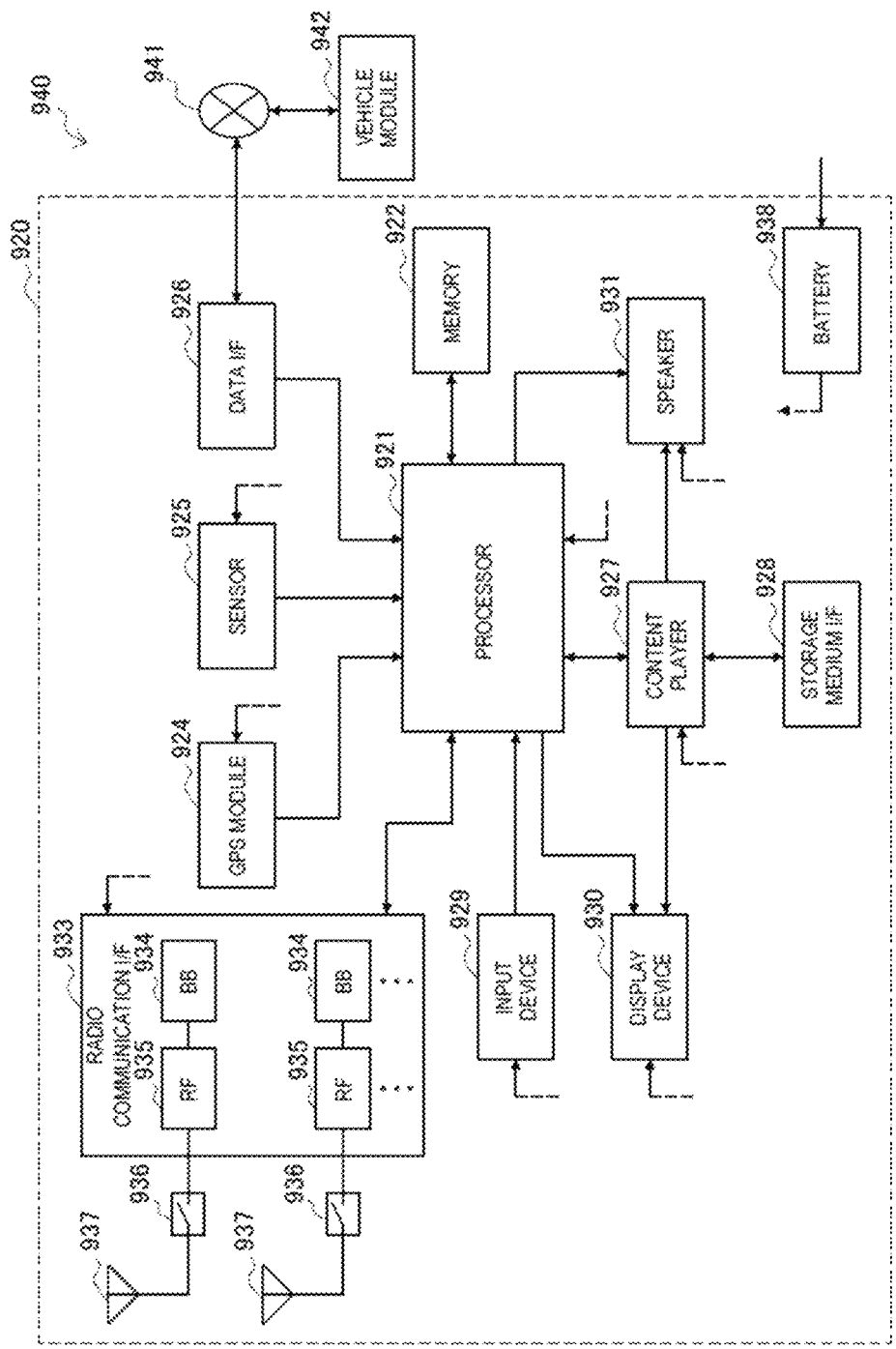
FIG. 22 is a block diagram showing an example of an exemplary configuration of a car navigation apparatus to which the technology according to the present disclosure may be applied.

FIG. 22 is a block diagram showing an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example a CPU or a SoC, and controls a navigation function and additional function of the car navigation apparatus 920. The memory 922 includes RAM and ROM, and stores a program that is executed by the processor 921, and data.

The GPS module 924 determines a position (such as latitude, longitude and altitude) of the car navigation apparatus 920 by using GPS signals received from a GPS satellite. The sensor 925 may include a group of sensors such as a gyro sensor, a geomagnetic sensor and an air pressure sensor. The data interface 926 is connected to, for example, an in-vehicle network 941 via a terminal that is not shown, and acquires data (such as vehicle speed data) generated by the vehicle.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or information inputted from a user. The display device 930 includes a screen such as an LCD or OLED display, and displays an image of the navigation function or content that is reproduced. The speaker 931 outputs a sound for the navigation function or the content that is reproduced.

The radio communication interface 933 supports any cellular communication scheme (such as LTE and LTE-Advanced), and performs wireless communication. The radio communication interface 933 may typically include, for example, a BB processor 934 and an RF circuit 935. The BB processor 934 may perform, for example, encoding/decoding, modulating/demodulating and multiplexing/demultiplexing, and perform various types of signal processing for wireless communication. The RF circuit 935 may include, for example, a mixer, a filter and an amplifier, and transmits and receives wireless signals via the antenna 937. The radio communication interface 933 may also be a chip module having the BB processor 934 and the RF circuit 935 integrated thereon. The radio communication interface 933 may include multiple BB processors 934 and multiple RF circuits 935, as shown in FIG. 22. Although FIG. 22 shows the example in which the radio communication interface 933 includes the multiple BB processors 934 and the multiple RF circuits 935, the radio communication interface 933 may also include a single BB processor 934 and a single RF circuit 935.

Furthermore, in addition to a cellular communication scheme, the radio communication interface 933 may support another type of wireless communication scheme such as a short-distance wireless communication scheme, a near field communication scheme, and a wireless LAN scheme. In this case, the radio communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the radio communication interface 933.

Each of the antennas 937 includes a single or multiple antenna elements (such as multiple antenna elements included in an MIMO antenna), and is used by the radio communication interface 933 to transmit and receive wireless signals. As shown in FIG. 22, the car navigation apparatus 920 may include the multiple antennas 937. Although FIG. 22 shows the example in which the car navigation apparatus 920 includes the multiple antennas 937, the car navigation apparatus 920 may also include a single antenna 937.

Furthermore, the car navigation apparatus 920 may include the antenna 937 for each wireless communication scheme. In this case, the antenna switches 936 may be omitted from the configuration of the car navigation apparatus 920.

The battery 938 supplies power to the blocks of the car navigation apparatus 920 shown in FIG. 22 via feeder lines that are partially shown as dash lines in FIG. 22. The battery 938 accumulates power supplied from the vehicle.

In the car navigation apparatus 920 shown in FIG. 22, transceivers of the electronic apparatus 100, 300 and 600 may be implemented by the radio communication interface 933. At least a part of functions may be implemented by the processor 921. For example, the processor 921 can achieve the function of allowing other UE to share the COT of the present UE by performing functions of the generating unit 101 and the transmitting unit 102, can support multiple switching points within the MCOT by performing functions of the generating unit 301 and the transmitting unit 302, and can share the COT among multiple NOMA-UEs by performing functions of the channel detection unit 601 and the transmitting unit 602.

The technology of the present disclosure may also be implemented as an in-vehicle system (or a vehicle) 940 including one or more blocks of the car navigation apparatus 920, the in-vehicle network 941 and a vehicle module 942. The vehicle module 942 generates vehicle data (such as a vehicle speed, an engine speed, and failure information), and outputs the generated data to the in-vehicle network 941.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 2300 shown in FIG. 23) from a storage medium or network, wherein the computer is capable of implementing various functions when installed with various programs.

Figure 23:
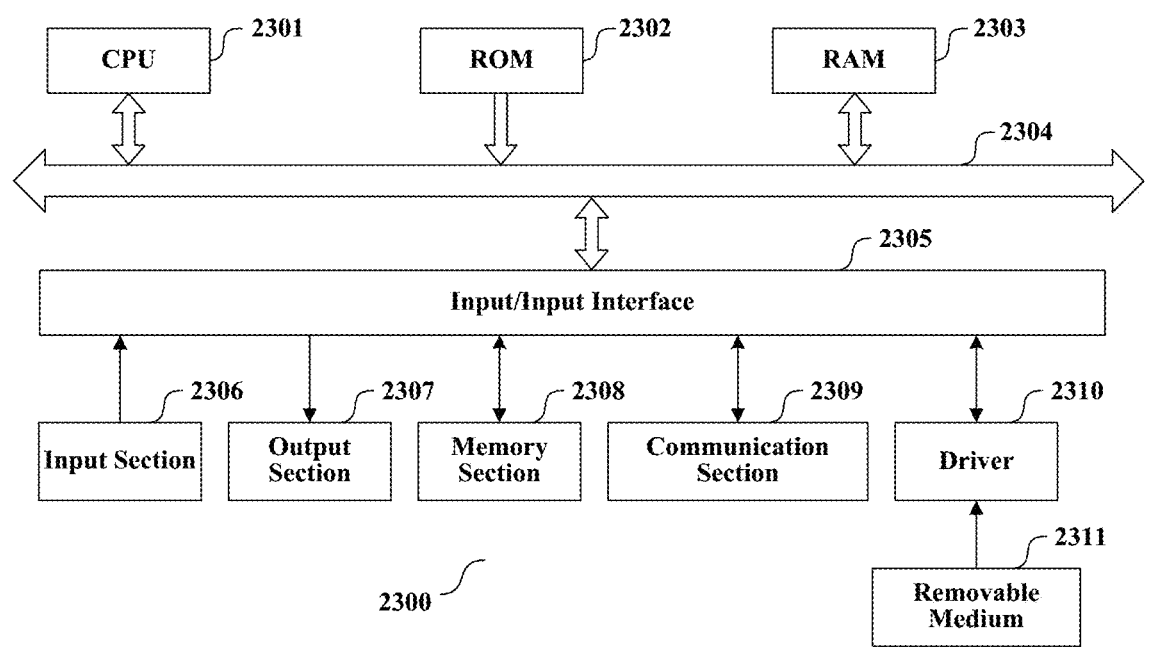
FIG. 23 is a block diagram of an exemplary block diagram illustrating the structure of a general purpose personal computer capable of realizing the method and/or device and/or system according to the embodiments of the present disclosure.

In FIG. 23, a central processing unit (CPU) 2301 executes various processing according to a program stored in a read-only memory (ROM) 2302 or a program loaded to a random access memory (RAM) 2303 from a memory section 2308. The data needed for the various processing of the CPU 2301 may be stored in the RAM 2303 as needed. The CPU 2301, the ROM 2302 and the RAM 2303 are linked with each other via a bus 2304. An input/output interface 2305 is also linked to the bus 2304.

The following components are linked to the input/output interface 2305: an input section 2306 (including keyboard, mouse and the like), an output section 2307 (including displays such as a cathode ray tube (CRT), a liquid crystal display (LCD), a loudspeaker and the like), a memory section 2308 (including hard disc and the like), and a communication section 2309 (including a network interface card such as a LAN card, modem and the like). The communication section 2309 performs communication processing via a network such as the Internet. A driver 2310 may also be linked to the input/output interface 2305, if needed. If needed, a removable medium 2311, for example, a magnetic disc, an optical disc, a magnetic optical disc, a semiconductor memory and the like, may be installed in the driver 2310, so that the computer program read therefrom is installed in the memory section 2308 as appropriate.

In the case where the foregoing series of processing is achieved through software, programs forming the software are installed from a network such as the Internet or a memory medium such as the removable medium 2311.

It should be appreciated by those skilled in the art that the memory medium is not limited to the removable medium 2311 shown in FIG. 23, which has program stored therein and is distributed separately from the apparatus so as to provide the programs to users. The removable medium 2311 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 2302 and the memory section 2308 in which programs are stored, and can be distributed to users along with the device in which they are incorporated.

To be further noted, in the apparatus, method and system according to the present disclosure, the respective components or steps can be decomposed and/or recombined. These decompositions and/or recombinations shall be regarded as equivalent solutions of the disclosure. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n)" in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic apparatus configured to operate as user equipment (UE) for wireless communications, comprising:
   processing circuitry, configured to:
   access into an unlicensed frequency band in accordance with a channel occupancy time assigned to the UE;
   after the UE has accessed into the unlicensed frequency band, determine whether or not a portion of the channel occupancy time assigned to the UE may be shared with another UE; and
   upon determining that the portion of the channel occupancy time assigned to the UE may be shared with the another UE, transmit channel occupancy time sharing information to a base station or the another UE,
   wherein the channel occupancy time sharing information comprises:
   an indication that the portion of the channel occupancy time assigned to the UE may be shared with the another UE, and
   each of:
   a duration of a maximum channel occupancy time for the sharing of the portion of the channel occupancy time assigned to the UE,
   a maximum channel occupancy expiration time for the sharing of the portion of the channel occupancy time assigned to the UE,
   a priority level for the sharing of the portion of the channel occupancy time assigned to the UE, and
   a time slot available for the sharing of the portion of the channel occupancy time assigned to the UE.

2. The electronic apparatus according to claim 1, wherein the processing circuitry is configured to transmit the indication to the base station in uplink control information.

3. The electronic apparatus according to claim 2, wherein the processing circuitry is configured to add an information bit of one bit in the uplink control information for the indication, or
   wherein the processing circuitry is configured to transmit the indication by multiplexing a channel occupancy time sharing indicator in the uplink control information,
   wherein the channel occupancy time sharing indicator indicates whether to allow the base station to transmit control signaling by sharing the channel occupancy time of the UE.

4. The electronic apparatus according to claim 1, wherein the processing circuitry is configured to transmit the indication to the other UE through a physical sidelink control channel.

5. The electronic apparatus according to claim 1, wherein the processing circuitry is configured to comprise the information in the uplink control information, to be transmitted to the base station, or wherein the processing circuitry is configured to comprise the information in sidelink control information, to be transmitted to the other UE.

6. The electronic apparatus according to claim 1, wherein the indication indicates that the other UE may access into spectrum resources within the portion of the channel occupancy time assigned to the UE without performing channel detection by the other UE.

7. A method performed by an electronic apparatus configured to operate as a user equipment (UE) for wireless communications, the method comprising:
   accessing into an unlicensed frequency band in accordance with a channel occupancy time assigned to the UE,
   after the accessing into the unlicensed frequency band, determining whether or not a portion of the channel occupancy time assigned to the UE may be shared with another UE; and
   upon determining that the portion of the channel occupancy time assigned to the UE may be shared with the another UE, transmitting channel occupancy time sharing information to a base station or the another UE,
   wherein the channel occupancy time sharing information comprises:
   an indication that the portion of the channel occupancy time assigned to the UE may be shared with the another UE, and
   each of:
   a duration of a maximum channel occupancy time for the sharing of the portion of the channel occupancy time assigned to the UE,
   a maximum channel occupancy expiration time for the sharing of the portion of the channel occupancy time assigned to the UE,
   a priority level for the sharing of the portion of the channel occupancy time assigned to the UE, and
   a time slot available for the sharing of the portion of the channel occupancy time assigned to the UE.

8. A non-transitory computer readable product containing instructions for causing a user equipment (UE) to perform a method, the method comprising:
   accessing into an unlicensed frequency band in accordance with a channel occupancy time assigned to the UE,
   after the accessing into the unlicensed frequency band, determining whether or not a portion of the channel occupancy time assigned to the UE may be shared with another UE; and
   upon determining that the portion of the channel occupancy time assigned to the UE may be shared with the another UE, transmitting channel occupancy time sharing information to a base station or the another UE,
   wherein the channel occupancy time sharing information comprises:
   an indication that the portion of the channel occupancy time assigned to the UE may be shared with the another UE, and
   each of:
   a duration of a maximum channel occupancy time for the sharing of the portion of the channel occupancy time assigned to the UE,
   a maximum channel occupancy expiration time for the sharing of the portion of the channel occupancy time assigned to the UE,
   a priority level for the sharing of the portion of the channel occupancy time assigned to the UE, and
   a time slot available for the sharing of the portion of the channel occupancy time assigned to the UE.

* * * * *